(12) United States Patent
Yi et al.

(10) Patent No.: US 10,574,502 B2
(45) Date of Patent: Feb. 25, 2020

(54) METHOD AND APPARATUS FOR CONFIGURING FRAME STRUCTURE FOR NEW RADIO ACCESS TECHNOLOGY IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,892

(22) PCT Filed: May 22, 2017

(86) PCT No.: PCT/KR2017/005289
§ 371 (c)(1),
(2) Date: Jun. 21, 2018

(87) PCT Pub. No.: WO2017/204511
PCT Pub. Date: Nov. 30, 2017

(65) Prior Publication Data
US 2019/0075006 A1 Mar. 7, 2019

Related U.S. Application Data

(60) Provisional application No. 62/356,521, filed on Jun. 29, 2016, provisional application No. 62/340,490, (Continued)

(51) Int. Cl.
*H04L 27/26* (2006.01)
*H04L 5/00* (2006.01)
*H04W 72/04* (2009.01)

(52) U.S. Cl.
CPC ........ *H04L 27/2666* (2013.01); *H04L 5/0007* (2013.01); *H04L 27/26* (2013.01); (Continued)

(58) Field of Classification Search
None
See application file for complete search history.

(56) References Cited

U.S. PATENT DOCUMENTS

| | | |
|---|---|---|
| 2008/0084845 A1 | 4/2008 | Kuchibhotla et al. |
| 2010/0118806 A1 | 5/2010 | Griot |
| 2012/0039292 A1 | 2/2012 | Lee |
| 2014/0071954 A1 | 3/2014 | Au et al. |
| 2015/0117363 A1 | 4/2015 | Rong |
| 2015/0195113 A1 | 7/2015 | Kim |
| 2015/0358801 A1 | 12/2015 | Seo |

(Continued)

FOREIGN PATENT DOCUMENTS

JP  2007195022  8/2007

OTHER PUBLICATIONS

Fujitsu, "DL long CP sub-frame structure for E-UTRA", R1-060196, 3GPP TSG RAN WG1 LTE ad hoc meeting, Helsinki, Finland, Jan. 23-25, 2006, 7 pages.

(Continued)

*Primary Examiner* — Mohammad S Adhami
(74) *Attorney, Agent, or Firm* — Fish & Richardson P.C.

(57) ABSTRACT

For supporting a new radio access technology (new RAT, or NR), a frame structure for the new RAT may be configured. A network node configures a frame in which a first cyclic prefix (CP) is allocated to a first symbol in every 0.5 ms and a second CP is allocated to remaining symbols in every 0.5 ms. In this case, a length of the first CP is longer than a length of the second CP.

16 Claims, 21 Drawing Sheets

Related U.S. Application Data filed on May 23, 2016, provisional application No. 62/339,925, filed on May 22, 2016.

(52) U.S. Cl.
CPC ...... *H04L 27/2602* (2013.01); *H04L 27/2607* (2013.01); *H04L 27/2646* (2013.01); *H04W 72/0446* (2013.01)

(56) References Cited

U.S. PATENT DOCUMENTS

| | | | |
|---|---|---|---|
| 2016/0352551 A1* | 12/2016 | Zhang | H04L 27/2602 |
| 2017/0310431 A1 | 10/2017 | Iyer et al. | |
| 2017/0311276 A1 | 10/2017 | Tsai et al. | |
| 2017/0332378 A1 | 11/2017 | Werner et al. | |
| 2017/0332396 A1 | 11/2017 | Liao et al. | |
| 2017/0339697 A1 | 11/2017 | Park et al. | |
| 2018/0152276 A1 | 5/2018 | Hu et al. | |
| 2018/0227155 A1 | 8/2018 | Khoryaev et al. | |

OTHER PUBLICATIONS

Huawei, HiSilicon, "Evaluation of scalable numerology proposals", R1-164030, 3GPP TSG RAN WG1 Meeting #85, Nanjing, China, dated May 23-27, 2016, 10 pages.
U.S. Appl. No. 62/320,252, Zhang et al.
United States Office Action in U.S. Appl. No. 16/388,344, dated Jun. 14, 2019, 18 pages.
ZTE, ZTE Microelectronics, "Overview of numerology candidates," R1-164271, 3GPP TSG RAN WG1 Meeting #85, Nanjing, China, May 23-27, 2016, 7 pages.
Qualcomm Incorporated, "Numerology and TTI multiplexing for NR Forward Compatibility Analysis," R1-164692, 3GPP TSG-RAN WG1 #85, Nanjing, China, May 23-27, 2016, 8 pages.
Huawei, HiSilicon, "Numerology and Frame Structure for NR—Unlicensed," R1-164723, 3GPP TSG RAN WG1 Meeting #85, Nanjing, China, May 23-27, 2016, 5 pages.
Huawei, HiSilicon, "Remaining details of uplink frame structure design," R1-160329, 3GPP TSG RAN WG1 Meeting #84, St Julian's, Malta, dated Feb. 15-19, 2016, 8 pages.
Nokia, Alcatel-Lucent Shanghai Bell, "Comparison of different subcarrier-spacings," R1-165026, 3GPP TSG-RAN WG1 Meeting #85, Nanjing, P. R. China, dated May 23-27, 2016, 3 pages.
Nokia, Alcatel-Lucent Shanghai Bell, "Flexible numerology for 5G," R1-165024, 3GPP TSG-RAN WG1 Meeting #85, Nanjing, P. R. China, dated May 23-27, 2016, 4 pages.
United States Office Action in U.S. Appl. No. 16/388,344, dated Oct. 24, 2019, 27 pages.
Ericsson, "Numerology for NR," R1-163227, 3GPP TSG RAN WG1 Meeting #84bls, Busan, dated Apr. 11-15, 2016, 16 pages.
Extended European Search Report in European Application No. 17803030.0, dated Nov. 22, 2019, 8 pages.

* cited by examiner

[Fig. 1]
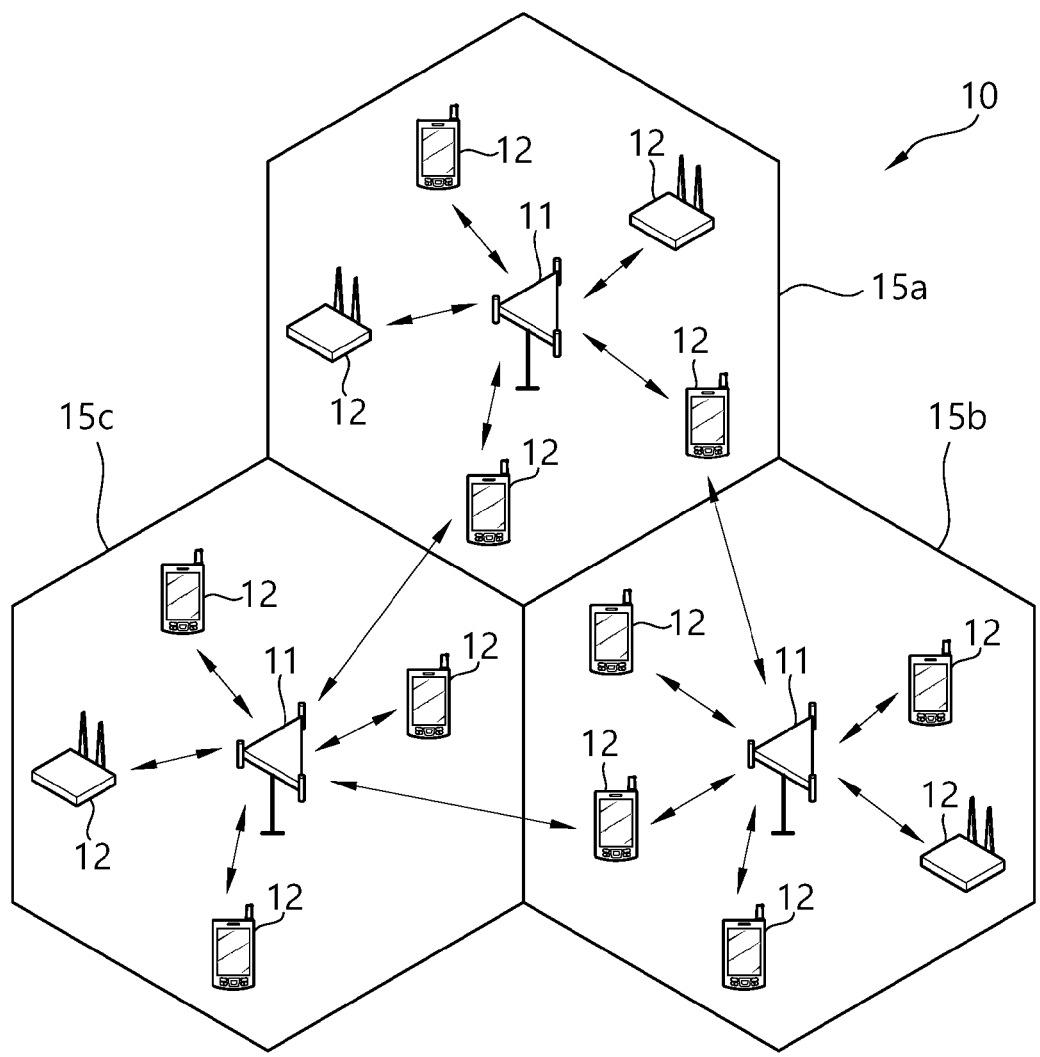
[Fig. 2]
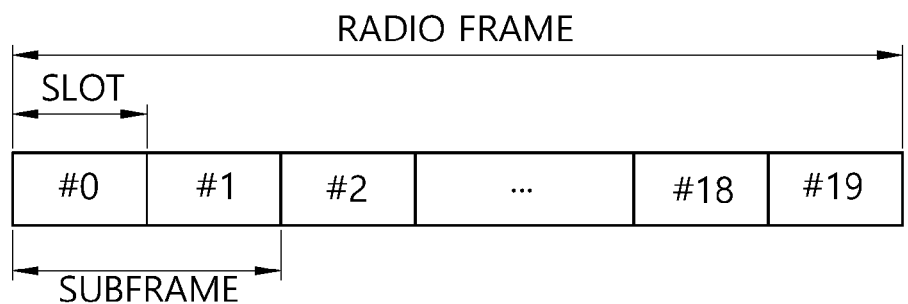

[Fig. 3]
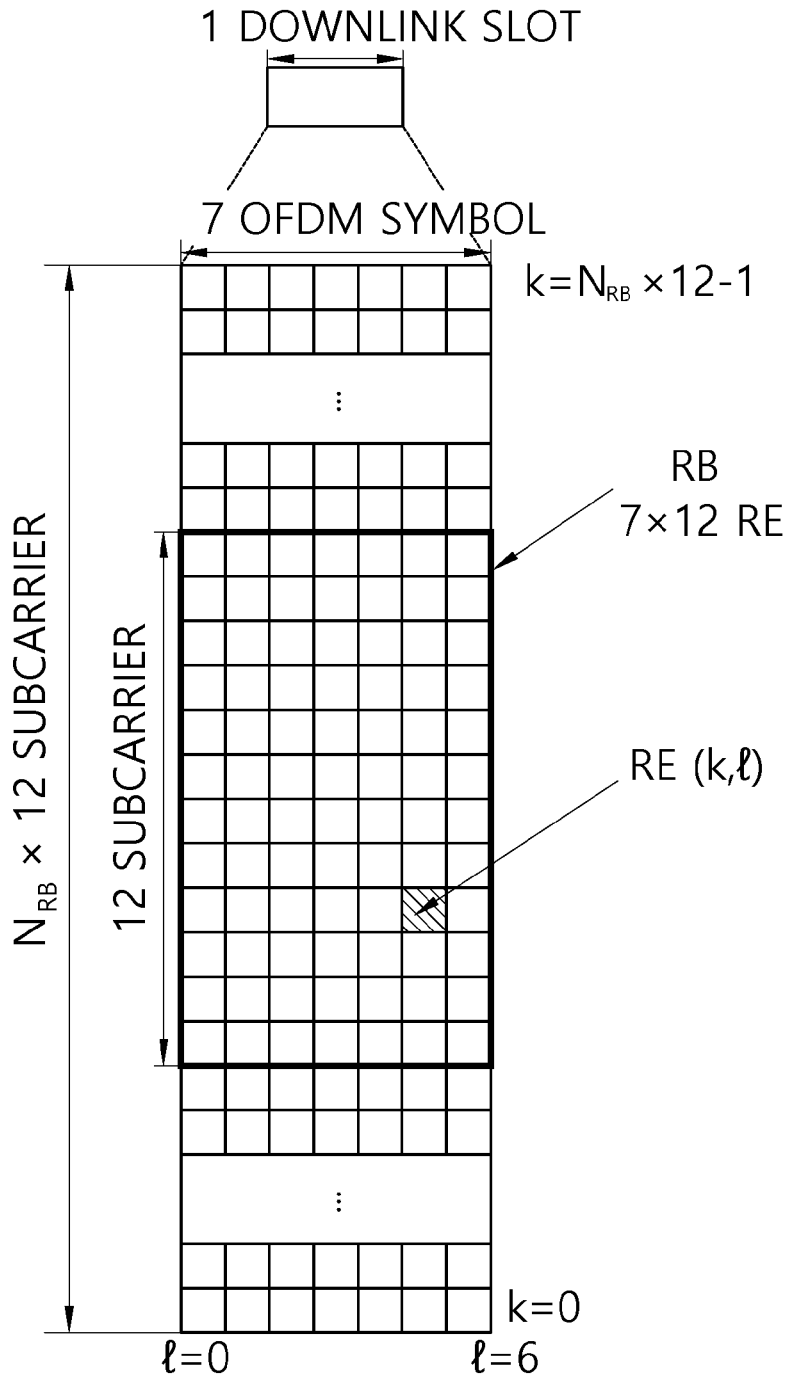

[Fig. 4]
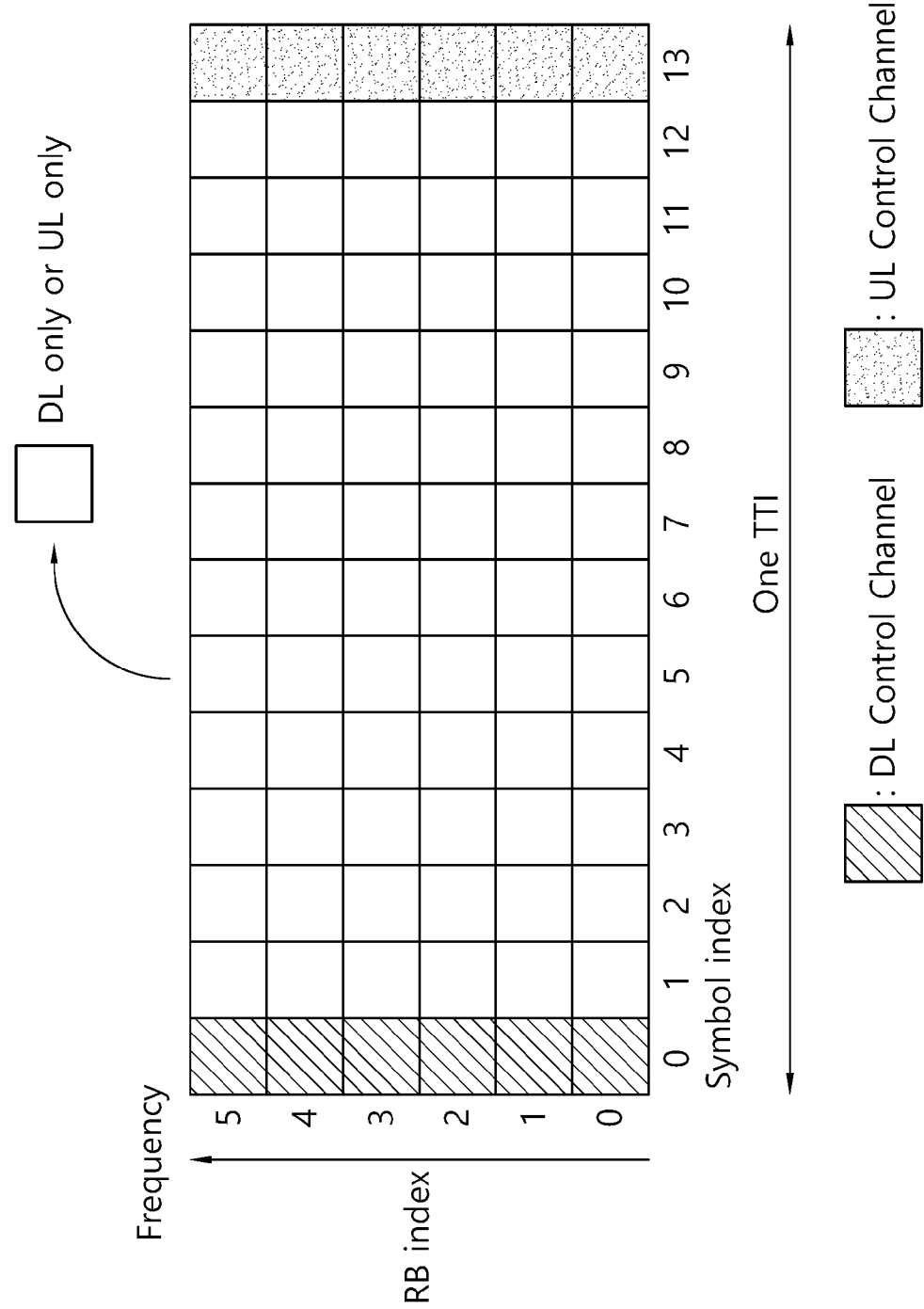

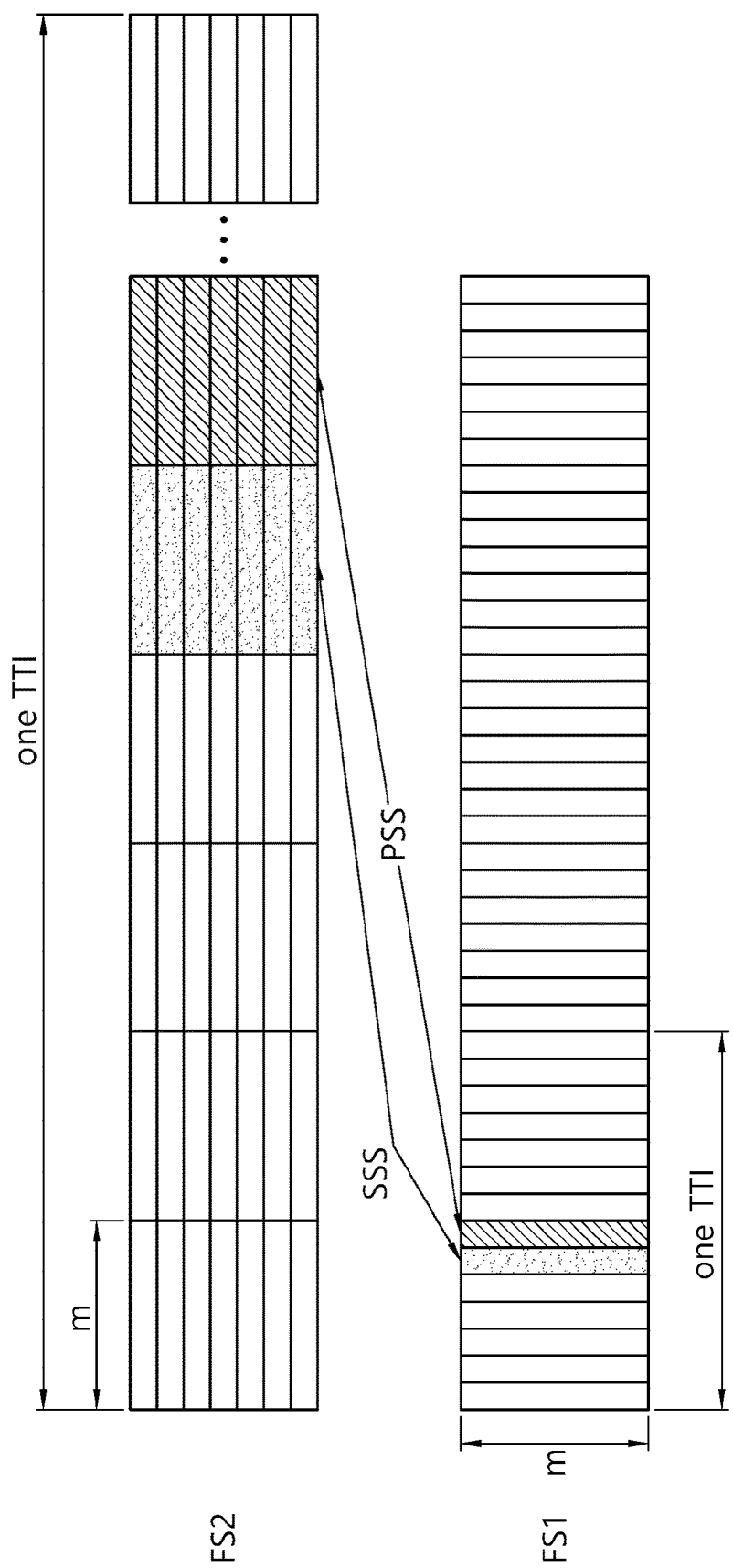
[Fig. 5]

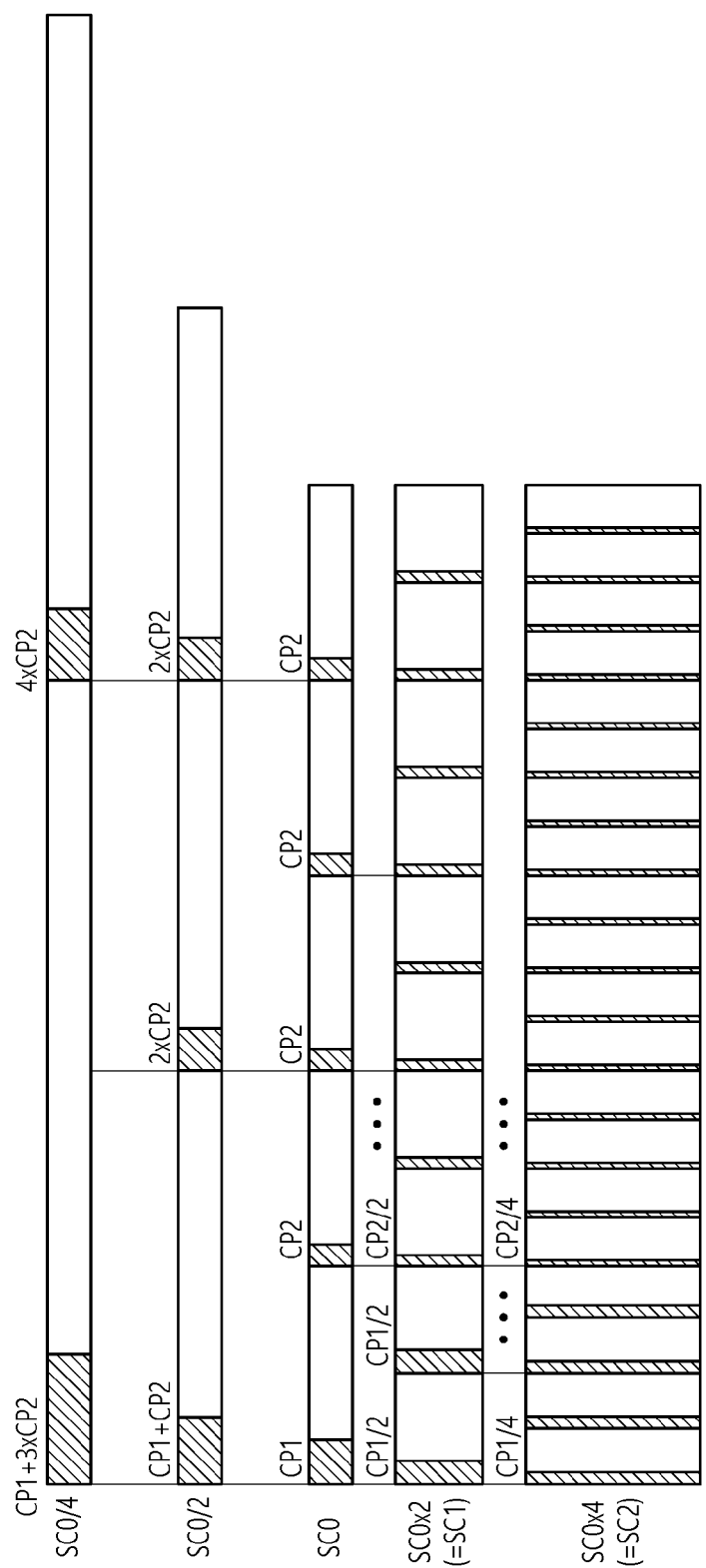
[Fig. 6]

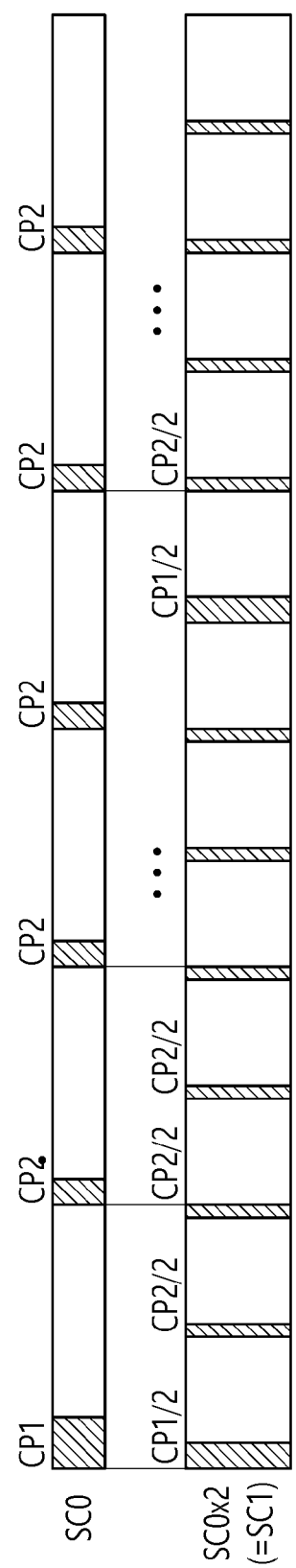
[Fig. 7]

[Fig. 8]
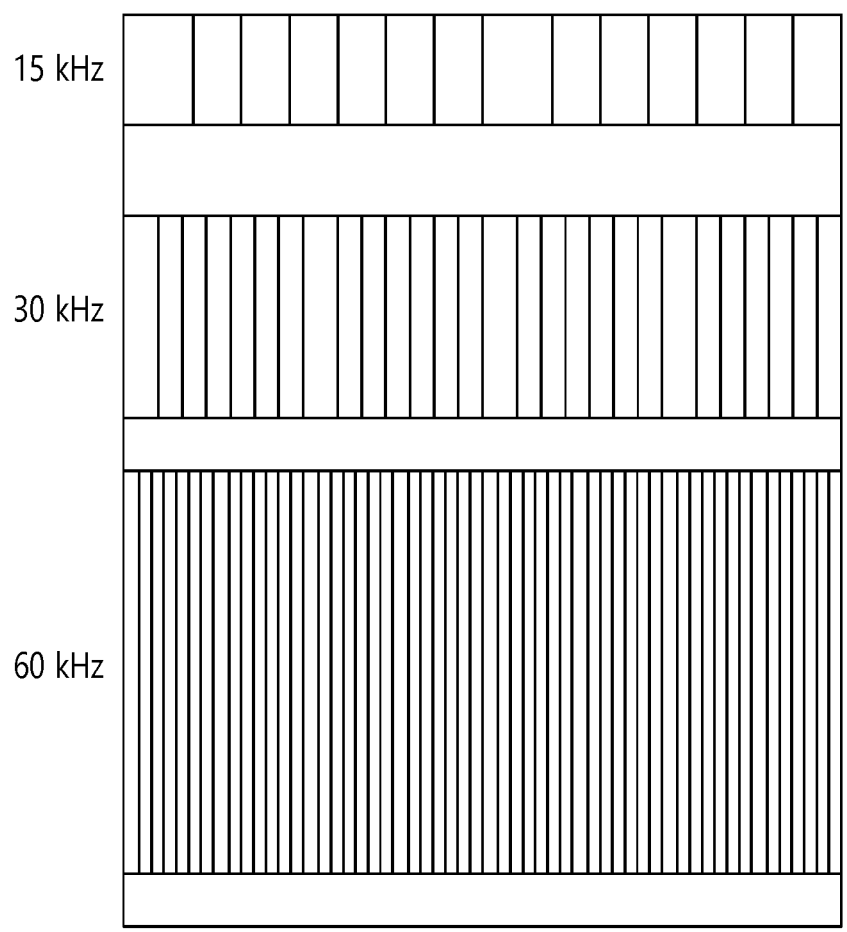

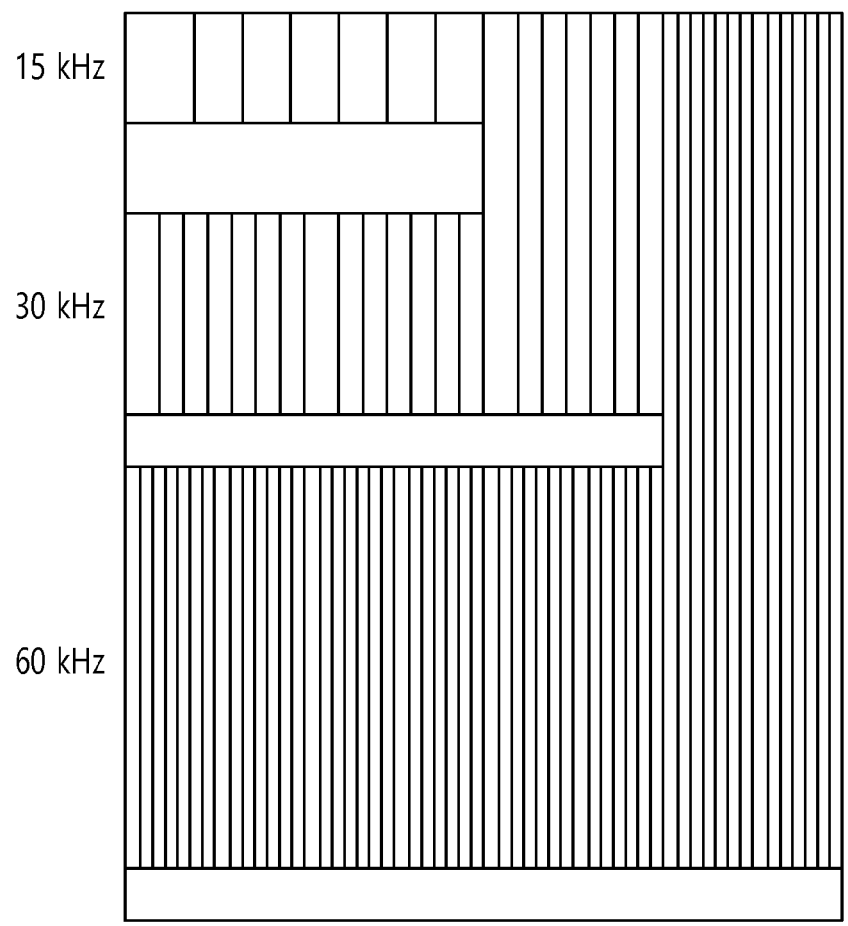
[Fig. 9]

[Fig. 10]
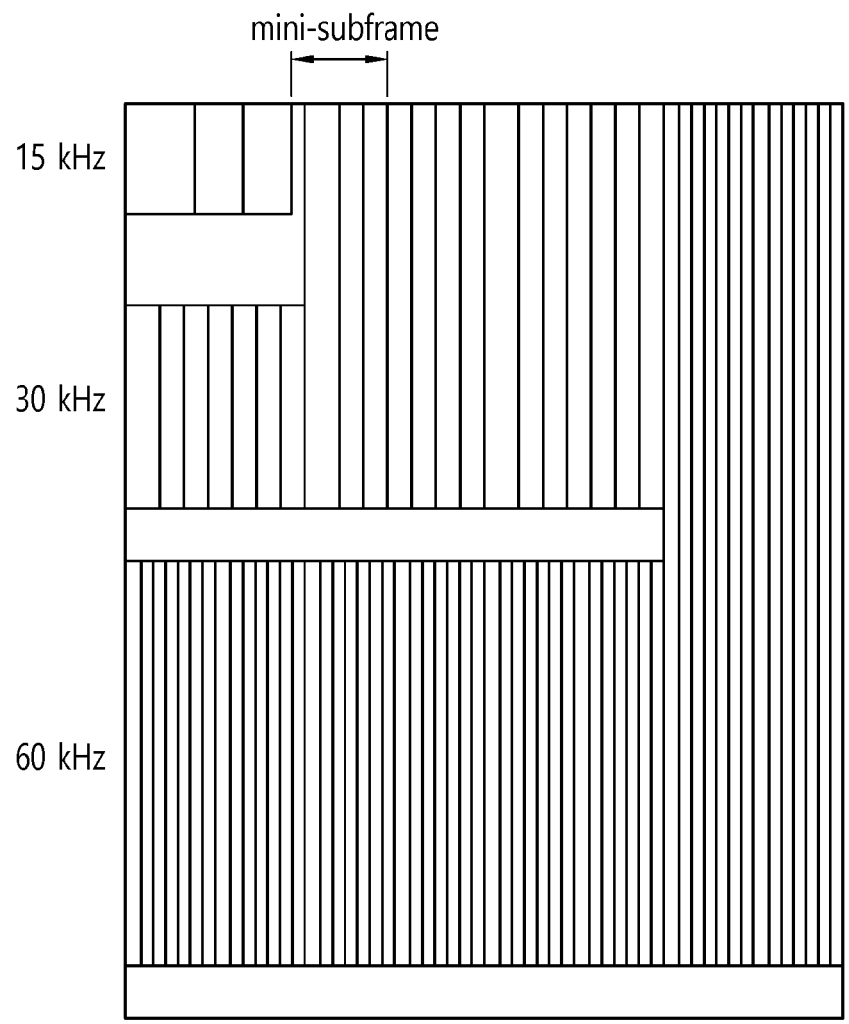

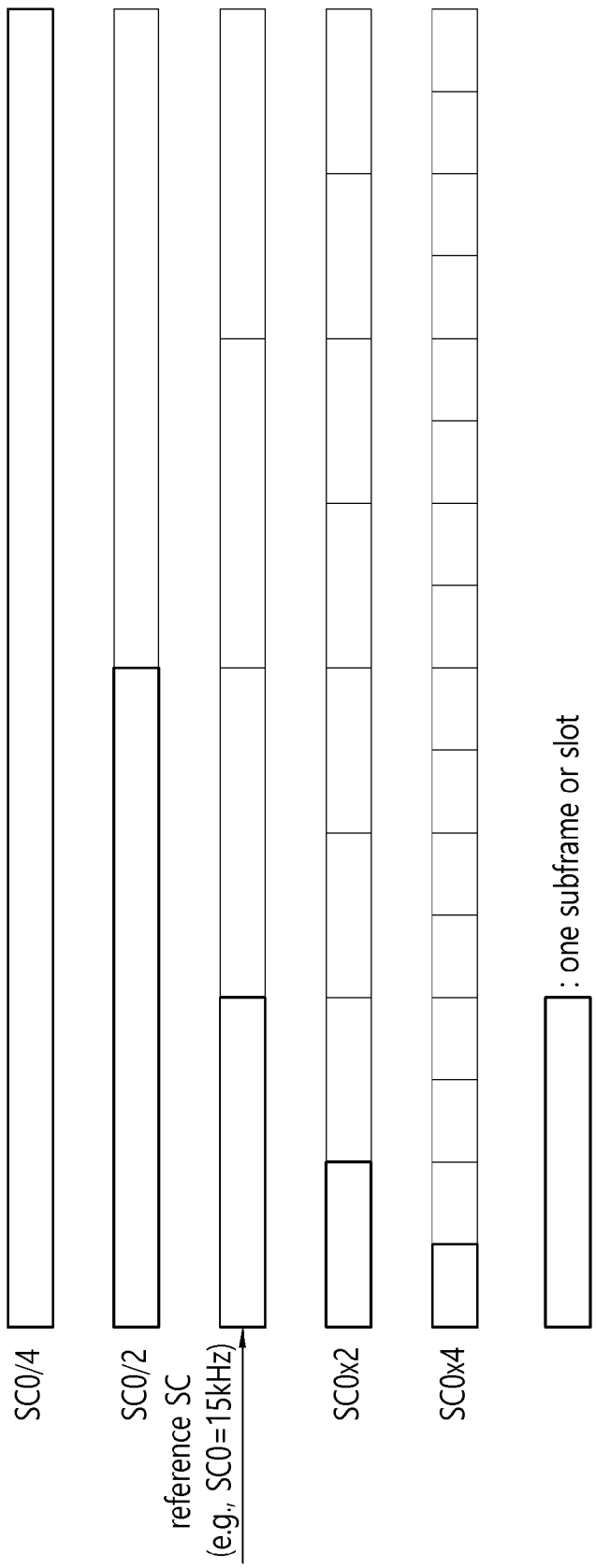

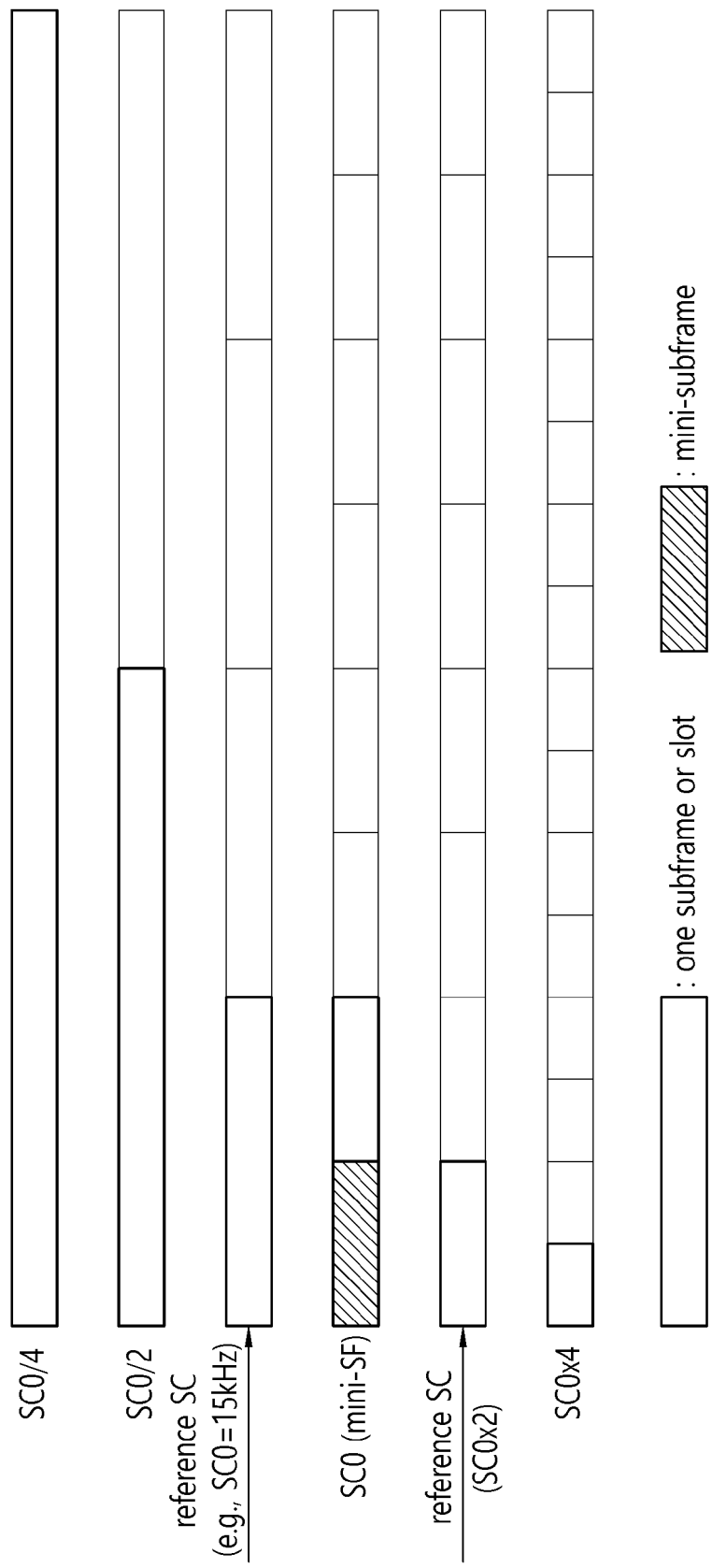
[Fig. 12]

[Fig. 13]
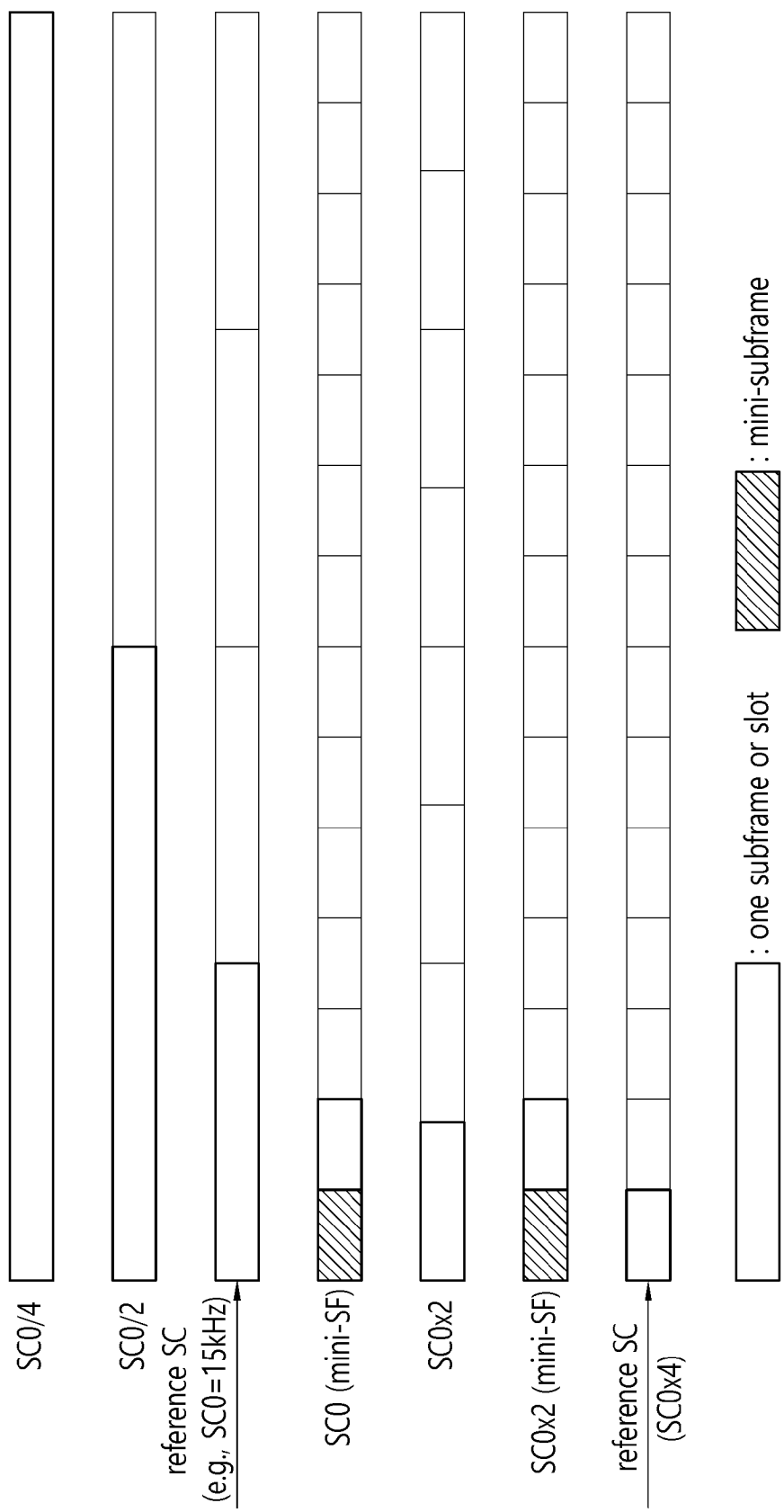

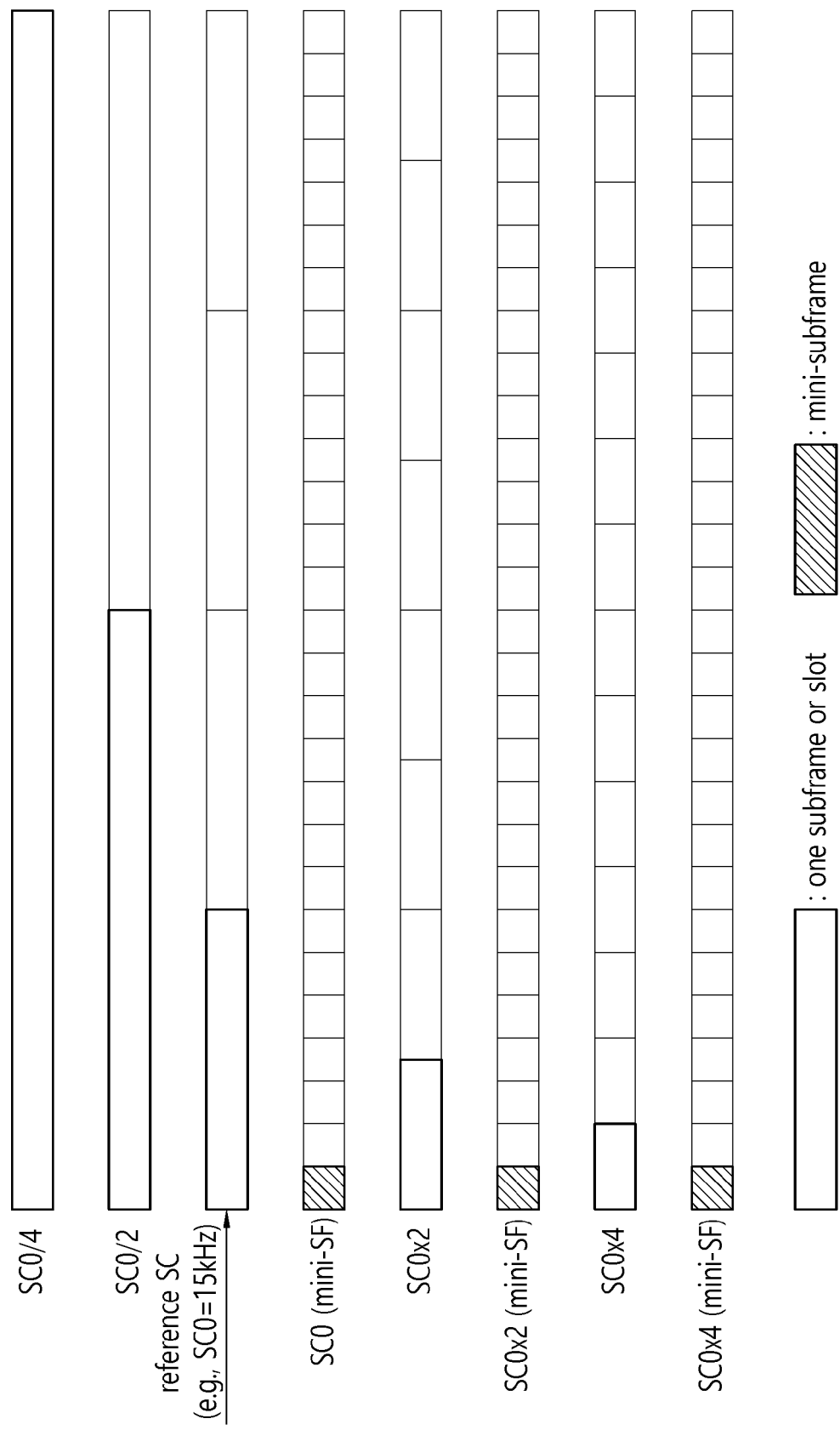
[Fig. 14]

[Fig. 15]
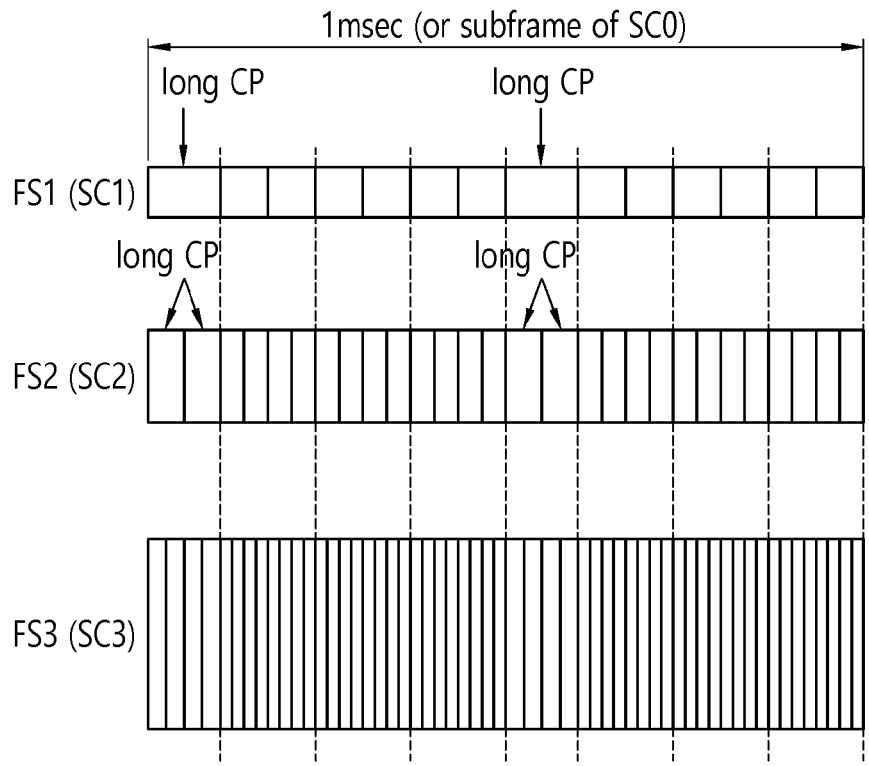
[Fig. 16]
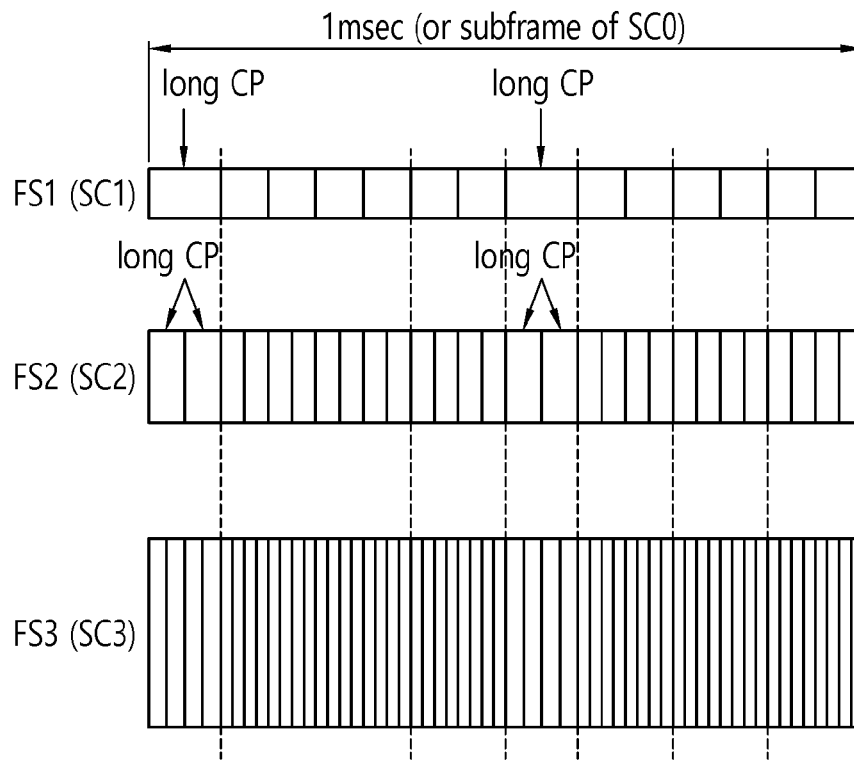

[Fig. 17]
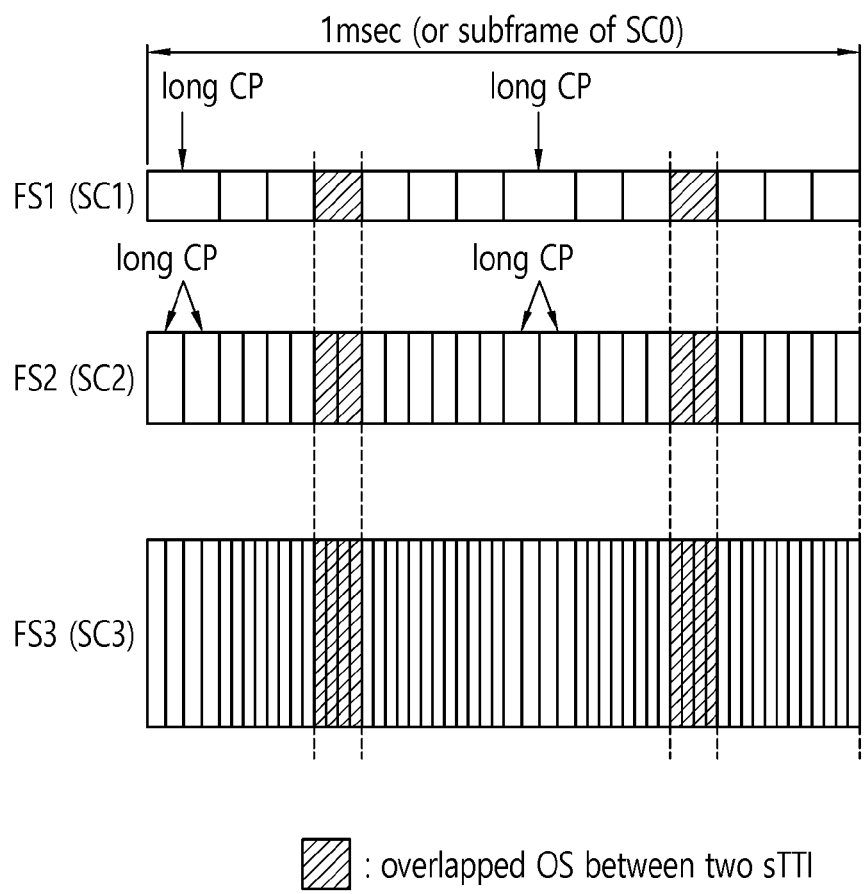

[Fig. 18]
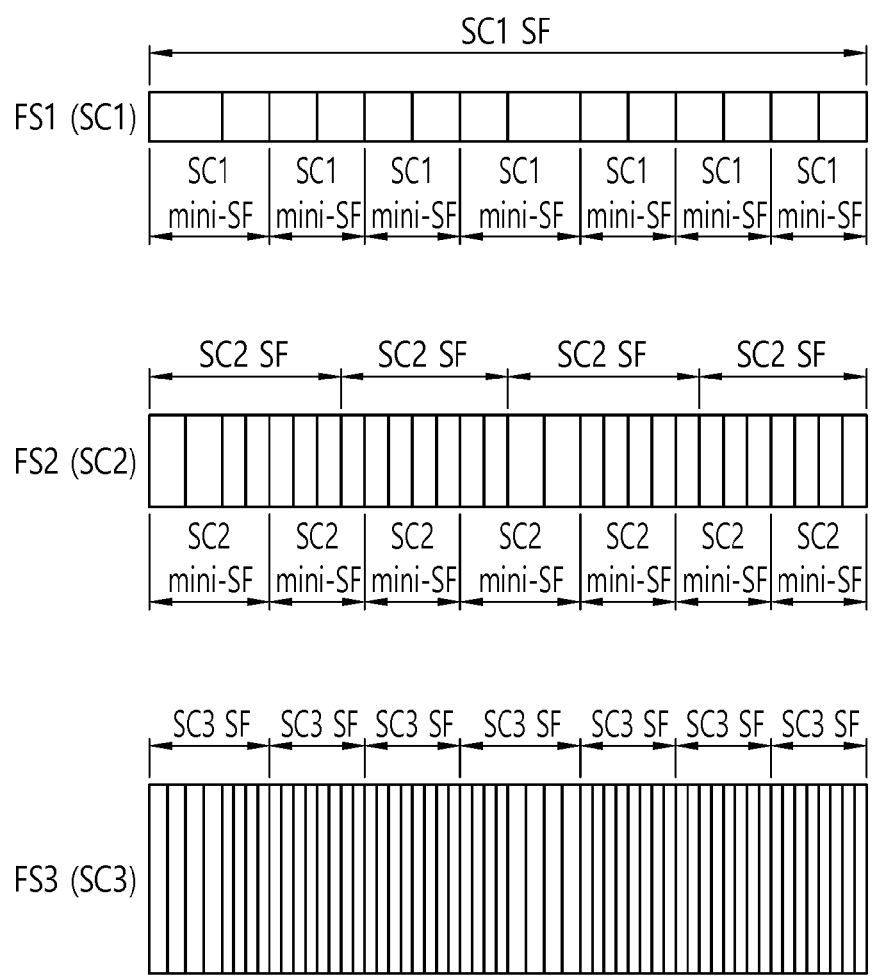

[Fig. 19]
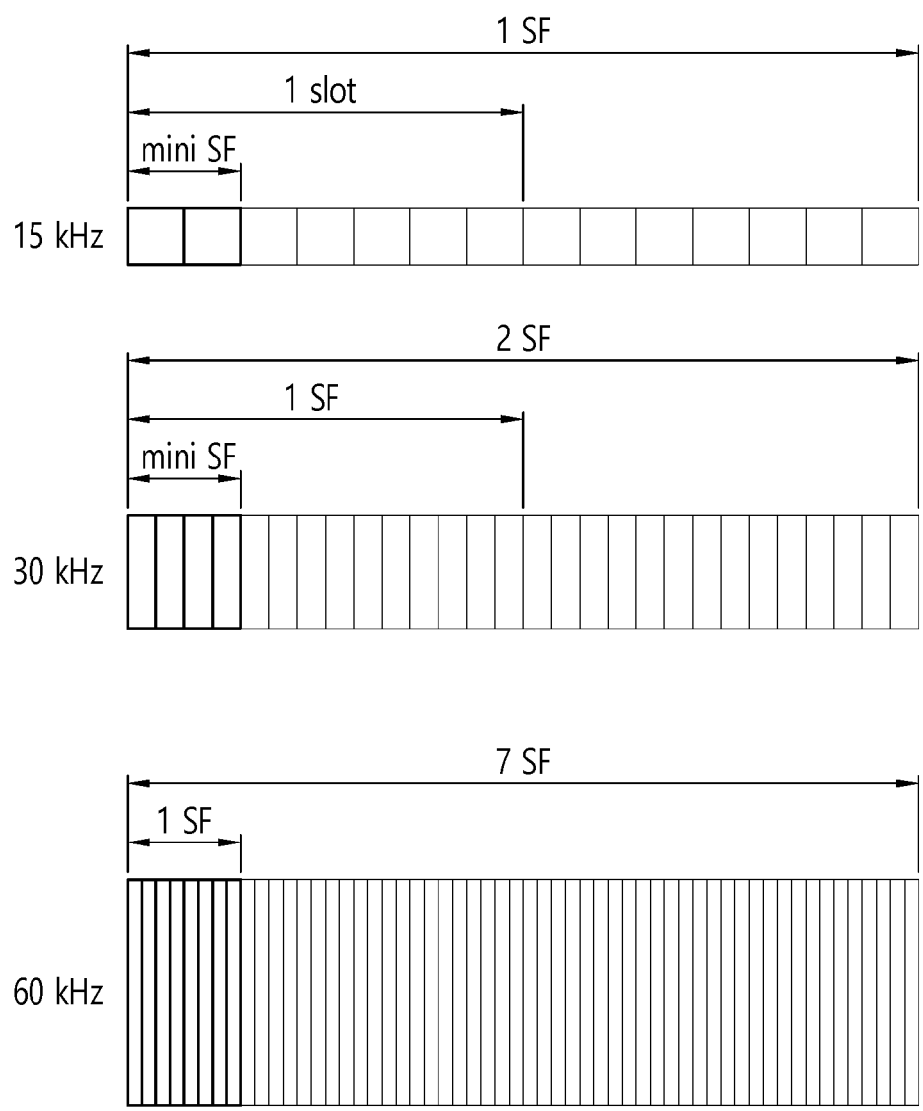

[Fig. 20]
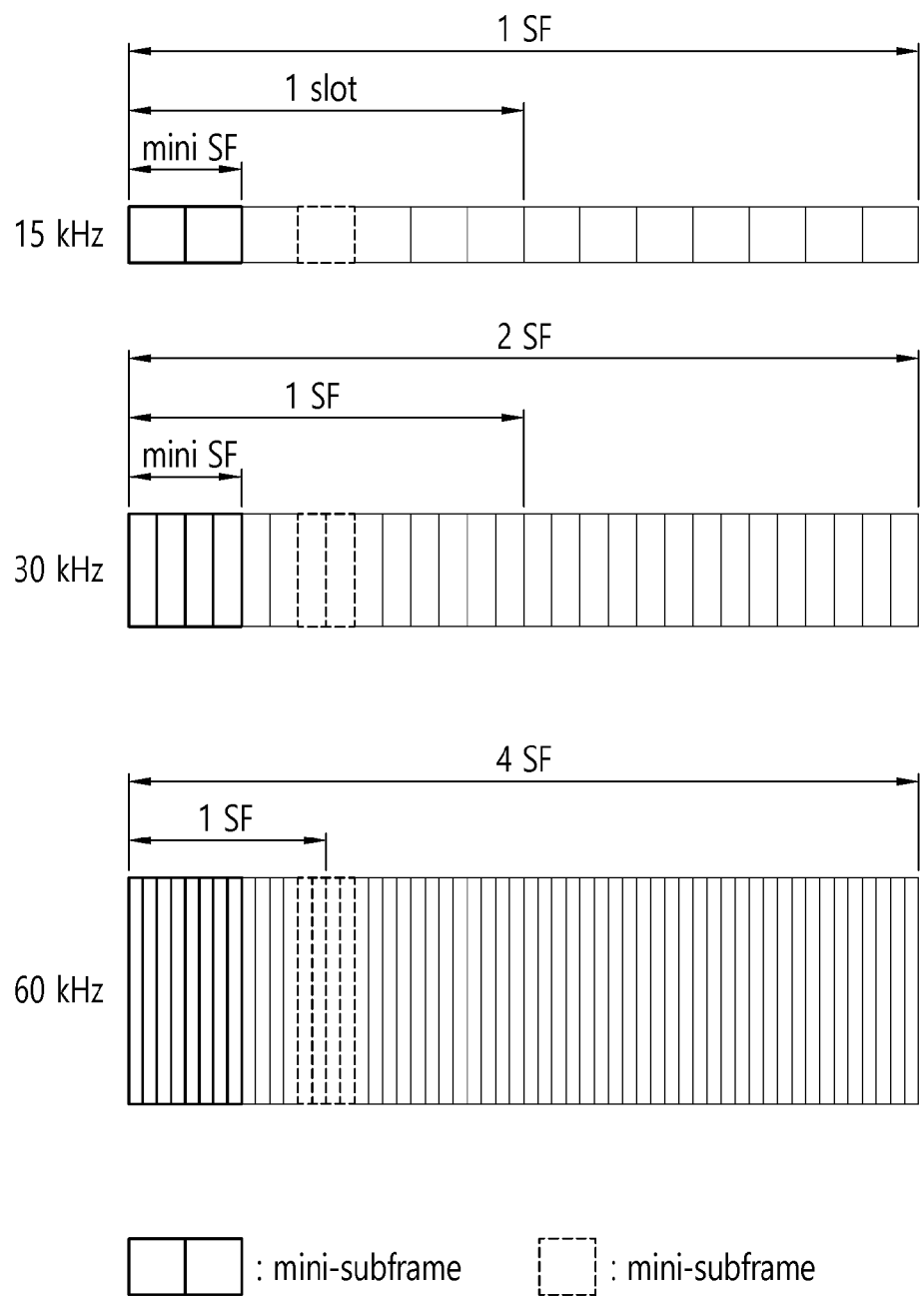

[Fig. 21]
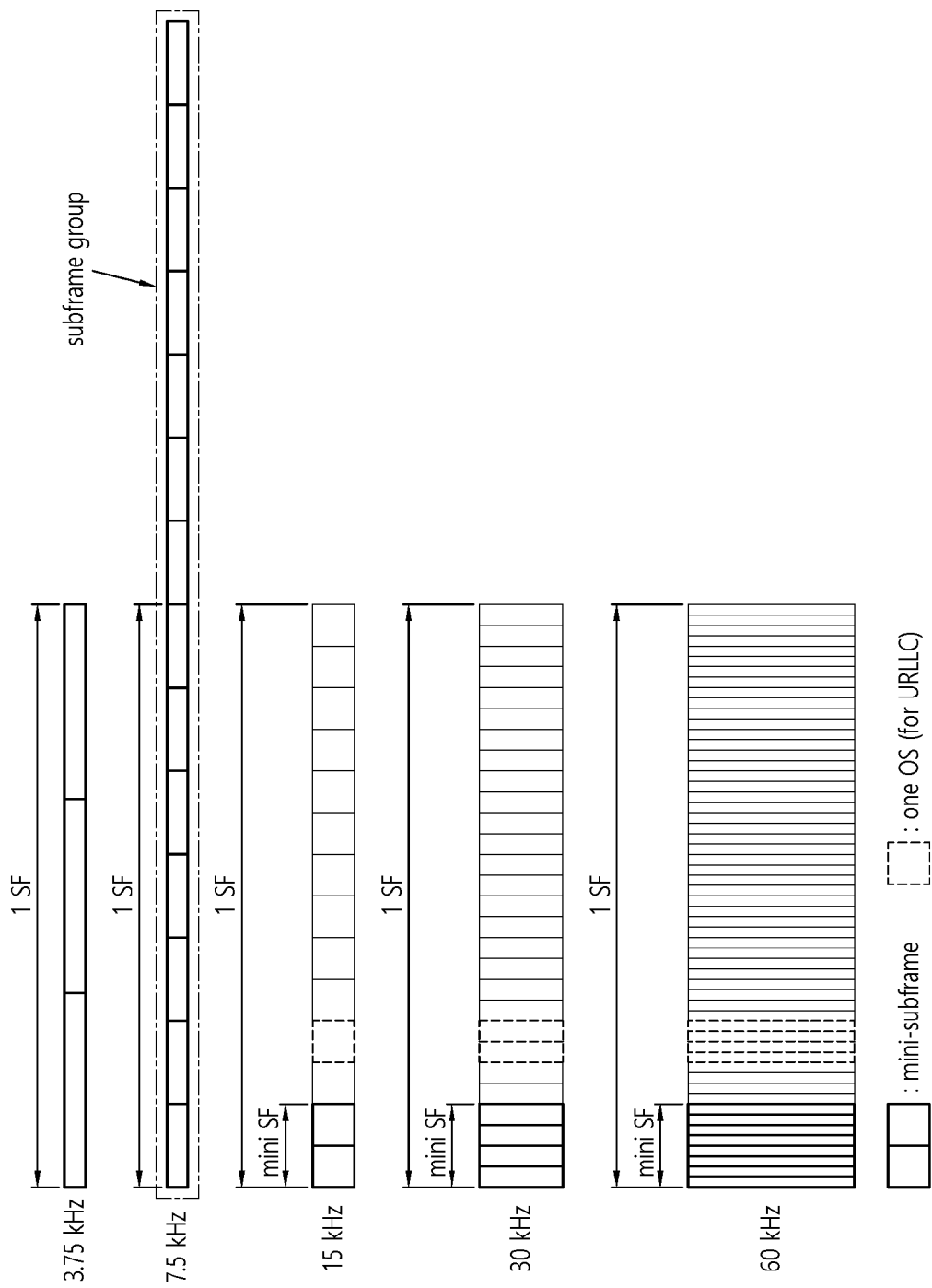

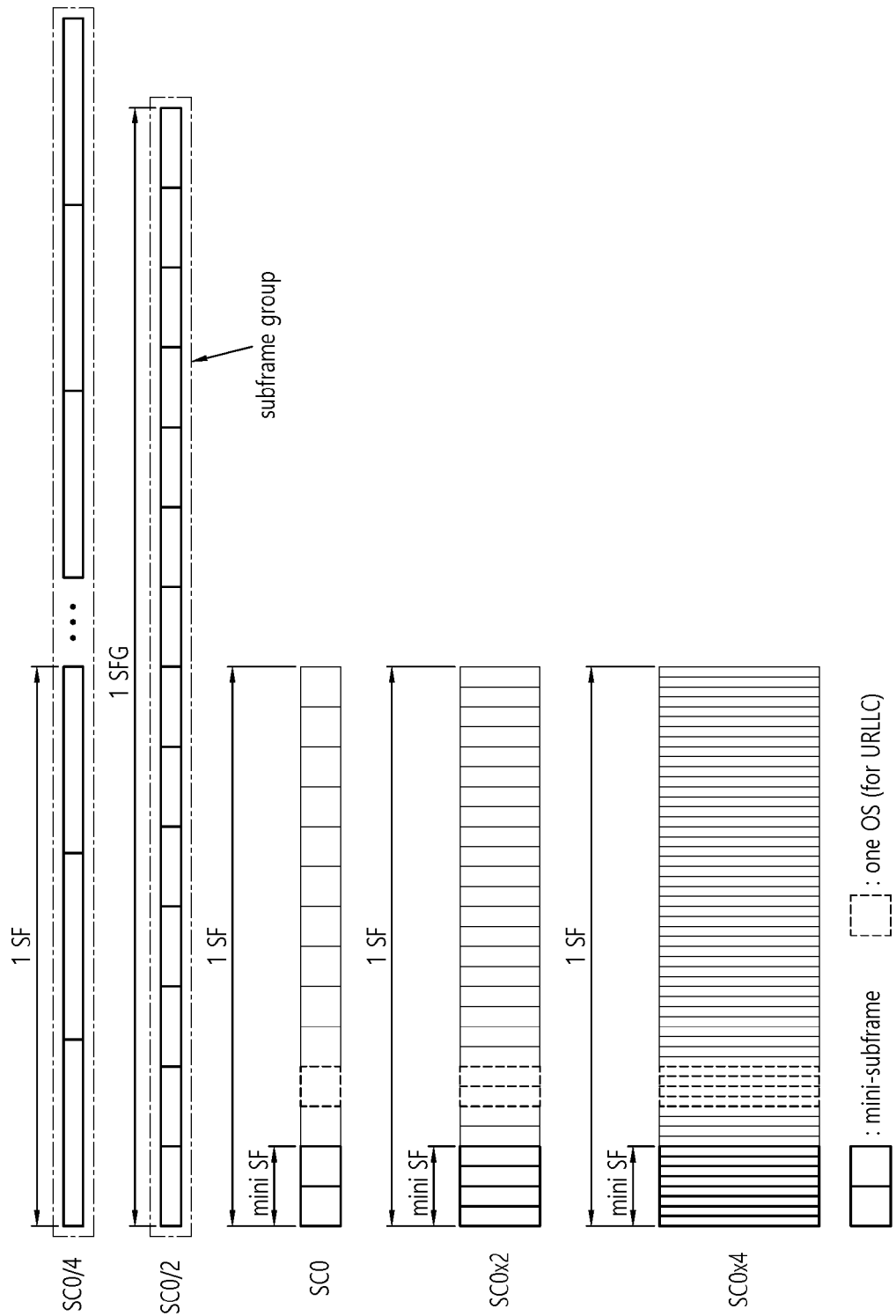
[Fig. 22]

[Fig. 23]
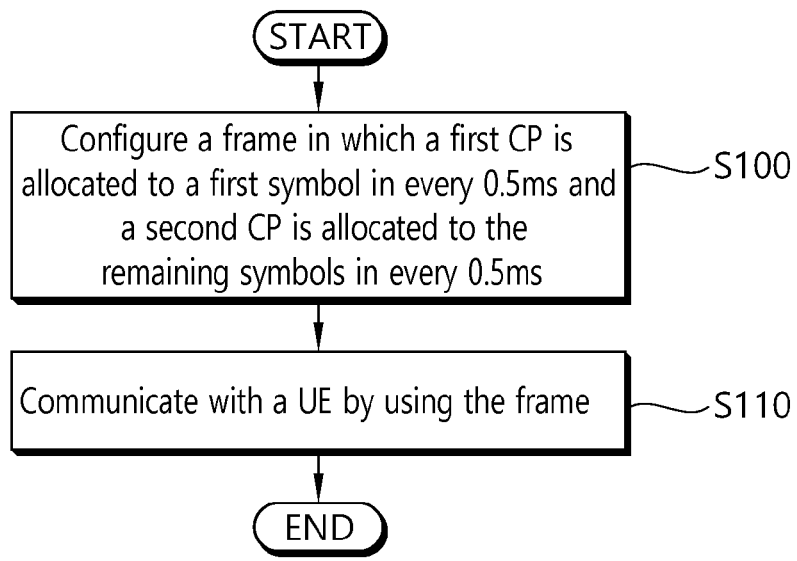
[Fig. 24]
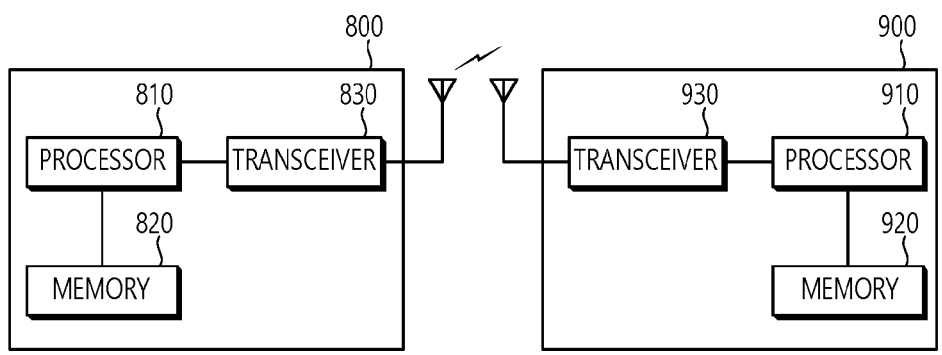

METHOD AND APPARATUS FOR CONFIGURING FRAME STRUCTURE FOR NEW RADIO ACCESS TECHNOLOGY IN WIRELESS COMMUNICATION SYSTEM

CROSS-REFERENCE TO RELATED APPLICATIONS

This application is the National Stage filing under 35 U.S.C. 371 of International Application No. PCT/KR2017/005289, filed on May 22, 2017, which claims the benefit of U.S. Provisional Application No. 62/339,925 filed on May 22, 2016, No. 62/340,490 filed on May 23, 2016, and No. 62/356,521 filed on Jun. 29, 2016, the contents of which are all hereby incorporated by reference herein in their entirety.

BACKGROUND OF THE INVENTION

Field of the Invention

The present invention relates to wireless communications, and more particularly, to a method and apparatus for configuring a frame structure for a new radio access technology (RAT) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience.

In the new RAT, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating new RAT efficiently, various schemes have been discussed. Specifically, a new frame structure may need to be required.

SUMMARY OF THE INVENTION

The present provides a method and apparatus for configuring a frame structure for a new radio access technology (RAT) in a wireless communication system. The present invention provides a method and apparatus for handling scalable numerology cyclic prefix (CP). The present invention further provides a method and apparatus for multiplexing different numerologies in a carrier. The present invention proposes frame structure, particularly focusing on cyclic prefix (CP) which will allow the same slot length except for the first slot in every 0.5 ms and also allow multiplexing of normal CP and extended CP of different numerologies in every mini-slot (e.g. 1 or 2 symbols of smaller subcarrier spacing).

In an aspect, a method for configuring a frame by a network node in a wireless communication system is provided. The method includes configuring a frame in which a first cyclic prefix (CP) is allocated to a first symbol in every 0.5 ms and a second CP is allocated to remaining symbols in every 0.5 ms, and communicating with a user equipment (UE) by using the frame. A length of the first CP is longer than a length of the second CP.

In another aspect, a network node in a wireless communication system is provided. The network node includes a memory, a transceiver, a processor, coupled to the memory and the transceiver, that configures a frame in which a first cyclic prefix (CP) is allocated to a first symbol in every 0.5 ms and a second CP is allocated to remaining symbols in every 0.5 ms, and controls the transceiver to communicate with a user equipment (UE) by using the frame. A length of the first CP is longer than a length of the second CP.

New frame structure can be configured for new RAT.

BRIEF DESCRIPTION OF THE DRAWINGS

FIG. 1 shows a wireless communication system.

FIG. 2 shows structure of a radio frame of 3GPP LTE.

FIG. 3 shows a resource grid for one downlink slot.

FIG. 4 shows an example of subframe type for new RAT.

FIG. 5 shows an example of a frame structure for a new RAT.

FIG. 6 shows an example of CP lengths according to an embodiment of the present invention.

FIG. 7 shows another example of CP lengths according to an embodiment of the present invention.

FIG. 8 shows an example of multiplexing different numerologies in a single carrier according to an embodiment of the present invention.

FIG. 9 shows another example of multiplexing different numerologies in a single carrier according to an embodiment of the present invention.

FIG. 10 shows another example of multiplexing different numerologies in a single carrier according to an embodiment of the present invention.

FIG. 11 shows an example of a frame structure considering multiplexing of different subcarrier spacing according to an embodiment of the present invention.

FIG. 12 shows another example of a frame structure considering multiplexing of different subcarrier spacing according to an embodiment of the present invention.

FIG. 13 shows another example of a frame structure considering multiplexing of different subcarrier spacing according to an embodiment of the present invention.

FIG. 14 shows another example of a frame structure considering multiplexing of different subcarrier spacing according to an embodiment of the present invention.

FIG. 15 shows another example of multiplexing different numerologies in a single carrier according to an embodiment of the present invention.

FIG. 16 shows another example of multiplexing different numerologies in a single carrier according to an embodiment of the present invention.

FIG. 17 shows another example of multiplexing different numerologies in a single carrier according to an embodiment of the present invention.

FIG. 18 shows another example of multiplexing different numerologies in a single carrier according to an embodiment of the present invention.

FIG. 19 shows another example of multiplexing different numerologies in a single carrier according to an embodiment of the present invention.

FIG. 20 shows another example of multiplexing different numerologies in a single carrier according to an embodiment of the present invention.

FIG. 21 shows an example of subframe indexing for different numerologies according to an embodiment of the present invention.

FIG. 22 shows another example of subframe indexing for different numerologies according to an embodiment of the present invention.

FIG. 23 shows a method for configuring a frame by a network node according to an embodiment of the present invention.

FIG. 24 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, new RAT will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for the new RAT. Particularly, different frame structure in which UL and DL may be present in every subframe or may change very frequently in the same carrier may be necessary for the new RAT. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In the new RAT, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in the new RAT, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for new RAT. The subframe shown in FIG. 4 may be used in TDD system of new RAT, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACKNACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

Further, in the new RAT, it may be considered to have different durations of TTI for different services with or without different subcarrier spacing. For example, a frame structure type 1 (FS1) may be formed to support, e.g. enhanced mobile broadband (eMBB) use cases while a frame structure type 2 (FS2) may be formed to support, e.g.

mMTC. For another example, single cell transmission and SFN transmission may utilize different subcarrier spacing. In the description below, for the convenience, it is assumed that the FS1 and FS2 are configured and coexist in the same carrier. The FS1 may be a baseline frame structure used for such as for eMBB use cases or typical use cases. The FS2 may be used for some other applications such as mMTC, ultra-reliable and low latency communication (URLLC), an enhanced vehicle-to-everything (eV2X) communication. The network or a cell may support one or multiple frame structures at the same time. For the convenience, the present invention may discuss relationship between two frame structures. However, more than two frame structures may be supported simultaneously. Further, eNB in the description below may be replaced by gNB which is entity of the new RAT. The eNB may refer any network entity relevant in each communication protocol framework without the loss of generality.

FIG. 5 shows an example of a frame structure for a new RAT. Referring to FIG. 5, frame structures utilizing different subcarrier spacing in potentially different subbands are described. It is shown that FS1 is the same as the conventional frame structure, as one TTI includes 14 symbols. That is, one TTI of FS1 is 1 ms. On the other hand, one TTI of FS2 is 'm' ms. 'm' may be predetermined. Or, 'm' may be determined based on subcarrier spacing used for mMTC.

1. Scalable Numerology CP Handling

To support various usage scenarios and different deployment scenarios with different CP length and latency requirements, multiple subcarrier spacing may be considered. Frame structures with multiple subcarrier spacing may be nested with each other. However, if different CP length is used in any frame structure, it may need to be clarified how the different CP is inherited to another frame structure. For example, if FS1 with subcarrier spacing 1 (hereinafter SC1) and FS2 with subcarrier spacing 2 (hereinafter, SC2) are to be nested with each other and SC2 is 2 times of SC1, it may be desirable to scale down the CP length proportionally. In this case, if there is any special symbol(s) with different CP compared to other symbols, some handing may be necessary.

For example, it may be assumed that there are OFDM symbols (OS) from OS1 . . . OSk in a slot (e.g. k=7) and OS1 . . . OS2k in a subframe. Further, it may be assumed that OS1 has longer CP than other OSs in SC1. In this case, handling CP of SC2 to be aligned with SC1 may follow at least one options described below.

(1) At OS level: CP of OS1 and OS2 in SC2 may be scaled down from CP of OS1 in SC1. That is, CP of two OSs in SC2 corresponding to the first OS in SC1 may be reduced to half from CP of SC1. CP of other OSs in SC2 may be scaled down or determined by OSm's CP=OSi's CP/2, where m=2*i. This approach may be assumed throughout the description below.

(2) At slot boundary level (e.g. OS1 . . . OSk): Two numerologies may be aligned at the slot/subframe boundary of SC1. In this case, extra CP length may be applied towards any OS in SC2 (i.e. OS1 . . . OSk) which is overlapped with special OS in SC1. For example, first one OS in SC2 may carry the extra CP length. Alternatively, first two OS in SC2 may carry the extra CP length.

(3) At slot/subframe boundary level of SC2: SC2 may be aligned with time duration of slot/subframe of SC1/m, when SC2=SC1*m (m>1). One slot/subframe duration of SC1 may be equally divided into m, and the slot/subframe duration of SC2 may always be aligned with the equally divided duration of SC1. This option may be a special case of option (2) described above.

(4) At multi-slot/Subframe boundary level: Two numerologies may be aligned at multiple subframe levels. For example, m slots of SC2 may be placed over n slots of SC1. This option may be similar to "non-aligned case". However, by utilizing this option, with different CP, at least alignments at 'n' slots of SC1 may be feasible. For example, 1 slot of 3.75 kHz subcarrier spacing may be aligned with 4 slots of 15 kHz subcarrier spacing, with some margin in 3.75 kHz subcarrier spacing.

There may be more than two numerologies at the system. In this case, a reference subcarrier spacing may be defined. The reference subcarrier spacing may be fixed to e.g. 15 kHz, or LTE numerology. Or, the reference subcarrier spacing may be configured by higher layer (e.g. 30 kHz). Or, the reference subcarrier spacing may be determined via cell search implicitly. For the reference subcarrier spacing, it may be assumed that it consist of 7 OS in a slot or subframe, and one OS may have special CP length compared to other OSs. For example, 15 kHz subcarrier spacing may be a reference subcarrier spacing in below 6 GHz, and 60 kHz subcarrier spacing may be a reference subcarrier spacing in above 6 GHz. Multiple special OS may also be present and mechanisms described in the present invention may be recursively applied. In this case, subframe may need to be elaborated such that nested frame structure starts from a reference subcarrier spacing. In other words, within symbol-level alignment, one special OS of reference subcarrier spacing may be configured, and CP of other OSs in reference subcarrier spacing may be constructed such that m*CP1 may be distributed over m OSs corresponding to special OS in SC0. CP1 is CP of the special OS, and m is SCm=m*SC0, and SC0 is the reference subcarrier spacing. If m is less than 1, any corresponding OS to special OS in SC0 may have special treatment. On the other hand, within slot boundary level alignment, CP formation may be aligned with each other as similar as possible (i.e. CPx, CP2 . . . CP2 (7 OS), where CP2 is the CP length of normal OS in SC0, and where CPx is CP1 if subframe or slot index i of SCm is such that i/m=0 (if m>1), and i % 1/m=0 (if m<1), and CPx is CP2 otherwise).

In the description below, subframe or slot may indicate a duration of 7 OS. With multiple subframe/slot boundary level alignment, CPx may be distributed rather evenly or depending on various patterns. For example, CPx may be CP1 of every first OS in every subframe of SCm (if m>1).

In 3GPP LTE, with fast Fourier transform (FFT) size of 2048 with 15 kHz subcarrier spacing, Ts is defined as 1/(15000*2048). Table 1 below different representation of Ts based on Ts of 3GPP LTE, according to FFT size and subcarrier spacing. Even though not described in Table 1, for other subcarrier spacing, e.g. 120 or 240 kHz subcarrier spacing, or for other FFT size, Table 1 may be simply expanded.

TABLE 1

| | FFT size | Subcarrier spacing | In Ts | Value |
|---|---|---|---|---|
| Ts-1 | 2048 | 15 kHz | Ts | 1/(15000 *2048) |
| Ts-2 | 4096 | 15 kHz | Ts/2 | 1/(15000 *4096) |
| Ts-3 | 2048 | 30 kHz | Ts/2 | 1/(30000 *2048) |
| Ts-4 | 4096 | 30 kHz | Ts/4 | 1/(30000 *4096) |
| Ts-5 | 1024 | 30 kHz | Ts | 1/(30000 *1024) |
| Ts-6 | 2048 | 60 kHz | Ts/4 | 1/(60000 *2048) |
| Ts-7 | 4096 | 60 kHz | Ts/8 | 1/(60000 *4096) |

TABLE 1-continued

| | FFT size | Subcarrier spacing | In Ts | Value |
|---|---|---|---|---|
| Ts-8 | 1024 | 60 kHz | Ts/2 | 1/(60000 *1024) |
| Ts-9 | 512 | 60 kHz | Ts | 1/(60000 *512) |
| Ts-10 | 2048 | 7.5 kHz | 2 *Ts | 1/(7500 *2048) |
| Ts-11 | 4096 | 7.5 kHz | Ts | 1/(7500 *4096) |
| Ts-12 | 1024 | 7.5 kHz | 4 * Ts | 1/(7500 *1024) |
| Ts-13 | 2048 | 3.75 kHz | 4* Ts | 1/(3750*2048) |
| Ts-14 | 128 | 3.75 kHz | 64 * Ts | 1/(3750 * 128) |
| Ts-15 | 64 | 3.75 kHz | 128 * Ts | 1/(3750 * 64) |
| Ts-16 | 32 | 3.75 kHz | 256 * Ts | 1/(3750 * 32) |
| Ts-17 | 16 | 3.75 kHz | 512 * Ts | 1/(3750 * 512) |
| Ts-18 | 128 | 15 kHz | 16 * Ts | 1/(15000 *128) |
| Ts-19 | 64 | 15 kHz | 32 * Ts | 1/(15000 * 64) |
| Ts-20 | 32 | 15 kHz | 64 * Ts | 1/(15000 *32) |
| Ts-21 | 128 | 30 kHz | 16 * Ts | 1/(30000 *128) |
| Ts-22 | 64 | 30 kHz | 32 * Ts | 1/(30000 * 64) |
| Ts-23 | 32 | 30 kHz | 64 * Ts | 1/(30000 *32) |
| Ts-24 | 128 | 60 kHz | 16 * Ts | 1/(60000 *128) |
| Ts-25 | 64 | 60 kHz | 32 * Ts | 1/(60000 * 64) |
| Ts-26 | 32 | 60 kHz | 64 * Ts | 1/(60000 *32) |

If 15 kHz subcarrier spacing is a reference subcarrier spacing and the network uses 15, 30, 60 kHz subcarrier spacing in below 6 GHz, one of options listed in Table 1 may be addressed. If 60 kHz subcarrier spacing is a reference subcarrier spacing and the network uses 60, 120, 240 kHz subcarrier spacing in above 6 GHz may correspond to 15, 30, 60 kHz in Table 1.

Basic options of CP lengths for reference subcarrier spacing in a slot will be described, which are identified without consideration of nested frame structure between different subcarrier spacing. Some values may be compatible to support nested frame structure. Different options may be used at the same time depending on mechanism to handle the alignment between different numerologies. The basic rules of creating CP options may be summarized as follows.

(1) Alt 1: The subframe duration is assumed as "D", which may be DL subframe duration of 3GPP LTE. 7 OS including CP may fulfill "D" without any left-over. CPs may be equally divided which gives base CP length (smaller value), and if left-over is present, the left-over may be added to one or a few OS.

(2) Alt 2: Similar to the Alt 1 described above, but CPs may be equally divided with reserved left-over.

(3) Alt 3: To align different subcarrier spacing and/or numerology at symbol level as much as possible with the reference subcarrier spacing or numerology, necessary CP handling may be achieved. For example, it may be assumed that CPx is the CP length of OSx in SC0 (i.e. reference subcarrier spacing). For CPy of OSy(s) in SC1 overlapped with OSx, CPy may be CPx/m, where SC1=m*SC0 (m>1). For CPy of OSy in SC2 overlapped with OSx(s), CPy may be sum (CPx) of overlapped CPx (m<1)

If CPy is not integer value, at least one of the following options may be used.

1) In order to avoid left-over, all CPy may be gathered, and Alt 1 described above may be applied. That is, between this option and Alt 1, only the CP determination mechanism may be different 2) Floor value may be taken, Alt 2 described above may be applied. That is, between this option and Alt 2, only the CP determination mechanism may be different.

3) CPs of two or multiple OSs may be added and divided into two or multiple integer values. For example, for 4.5, 4.5 for OS1 and OS2, summation value 9 may be divided into 5 and 4 for OS1 and OS2, respectively.

If FFT size are different from each other in SC0 and SC1, for CPy of OSy(s) in SC1 overlapped with OSx, CPy may be CPx/m/n, where SC1=m*SC0 (m>1) and FFT (SC1)=FFT (SC0)/n. For CPy of OSy in SC2 overlapped with OSx(s), CPy may be sum (CPx)/n of overlapped CPx (m<1), where FFT (SC2)=FFT (SC0)/n.

If CPy is not integer value, at least one of the following options may be used.

1) In order to avoid left-over, all CPy may be gathered, and Alt 1 described above may be applied. That is, between this option and Alt 1, only the CP determination mechanism may be different 2) Floor value may be taken, Alt 2 described above may be applied. That is, between this option and Alt 2, only the CP determination mechanism may be different.

3) CPs of two or multiple OSs may be added and divided into two or multiple integer values. For example, for 4.5, 4.5 for OS1 and OS2, summation value 9 may be divided into 5 and 4 for OS1 and OS2, respectively.

For example, for 15 kHz subcarrier spacing and 128 FFT size, CP length may be {10, 9, 9, 9, 9, 9, 9} in a slot.

For example, for 30 kHz subcarrier spacing and 128 FFT size, CP length may be {10, 10, 9, 9, 9, 9, 9} {9, 9, 9, 9, 9, 9, 9} in even slot/odd slot.

For example, for 30 kHz subcarrier spacing and 64 FFT size, CP length may be {5, 5, 4, 5, 4, 5, 4} {5, 4, 5, 4, 5, 4, 5}.

For example, 30 kHz subcarrier spacing and 32 FFT size, CP length may be {3, 2, 2, 2, 3, 2, 2} {2, 3, 2, 2, 2, 3, 2} or {3, 2, 2, 3, 2, 2, 2} {3, 2, 2, 2, 3, 2, 2}.

For example, for 60 kHz subcarrier spacing and 128 FFT size, CP length may be {10, 10, 10, 10, 9, 9, 9} {9, 9, 9, 9, 9, 9, 9} {9, 9, 9, 9, 9, 9, 9} {9, 9, 9, 9, 9, 9, 9} from 1st slot to 4th slot (repeated in 28 OS).

For example, for 60 kHz subcarrier spacing and 64 FFT size, CP length may be {5, 5, 5, 5, 5, 4, 5} {4, 5, 4, 5, 4, 5, 4} {5, 4, 5, 4, 5, 4, 5} {4, 5, 4, 5, 4, 5, 4} or {5, 5, 5, 5, 4, 5, 4} {5, 4, 5, 4, 5, 4, 5} {4, 5, 4, 5, 4, 5, 4} {5, 4, 5, 4, 5, 4, 5} from 1st slot to 4th slot (repeated in 28 OS).

For example, for 60 kHz subcarrier spacing and 32 FFT size, CP length may be {3, 2, 3, 2, 3, 2, 2} {2, 3, 2, 2, 2, 3, 2} {2, 2, 3, 2, 2, 2, 3} {2, 2, 2, 3, 2, 2, 2} or {3, 2, 3, 2, 2, 3, 2} {2, 3, 2, 2, 2, 3, 2} {2, 2, 3, 2, 2, 2, 3} {3, 2, 2, 2, 3, 2, 2} from 1st slot to 4th slot (repeated in 28 OS).

Table 2 shows basic options of CP length.

TABLE 2

| | FFT size | Subcarrier Spacing | In Ts | CP length in normal CP in Ts-x |
|---|---|---|---|---|
| Ts-1 | 2048 | 15 kHz | Ts | Alt 1: {160, 144, 144, 144, 144, 144, 144}Alt 2: {144, 144, 144, 144, 144, 144, 144}Alt 3: {160, 160, 144, 144, 144, 144, 144 . . . 144} (14 OS) if SC0 = 7.5 kHz |

TABLE 2-continued

| | FFT size | Subcarrier Spacing | In Ts | CP length in normal CP in Ts-x |
|---|---|---|---|---|
| Ts-2 | 4096 | 15 kHz | Ts/2 | Alt 1: {320, 288, 288, 288, 288, 288, 288}Alt 2: {288, 288, 288, 288, 288, 288, 288}Alt 3: {320, 320, 288, 288, 288, 288, 288, 288 . . . 288} (14OS) if SC0 = 7.5 kHz |
| Ts-3 | 2048 | 30 kHz | Ts/2 | Alt 1: {160, 144, 144, 144, 144, 144, 144} Alt 2: {144, 144, 144, 144, 144, 144, 144}Alt 3: {160, 160, 144, 144, 144, 144, 144, 144 . . .} (14OS) if SC0 = 15 kHz(any combination where 160 can be placed in different position is also considered) |
| Ts-4 | 4096 | 30 kHz | Ts/4 | Alt 1: {320, 288, 288, 288, 288, 288, 288}Alt 2: {all 288}Alt 3: {two 320, 12 times of 288} (14 OS) (any combination where 320 is placed in different position(s) is also considered) |
| Ts-5 | 1024 | 30 kHz | Ts | Alt 1: {80, 72, 72, 72, 72, 72, 72, 72}Alt 2: {72, 72, 72, 72, 72, 72, 72, 72}Alt 3: {80, 80, 72, 72 . . . 72, 72, 72} (any combination where 80 is placed in different position(s) is also considered) |
| Ts-6 | 2048 | 60 kHz | Ts/4 | Alt 1: {one 160, six 144 over 7 OS} or {one 208, 27 times of 144 over 28 OS}, {two 176, 26 times of 144 over 28 OS}, {four 160, 24 times of 144 over 28 OS}Alt 2: {seven 144 over 7 OS}Alt 3: {four 160, 24 times of 144 over 28 OS} or {two 176, 26 times of 144 over 28 OS} or {one 208, 27 times of 144 over 28 OS} if SC0 = 15 kHz(any combination where 160, 176, 208 is placed in different position(s) is also considered) |
| Ts-7 | 4096 | 60 kHz | Ts/8 | Alt 1: {one 320, six 288 over 7 OS} or {one 416, 27 times of 288 over 28 OS}, {two 352, 26 times of 288 over 28 OS}, {four 320, 24 times of 288 over 28 OS}Alt 2: {seven 288 over 7 OS}Alt 3: {four 320, 24 times of 288 over 28 OS} or {two 352, 26 times of 144 over 28 OS} or {one 416, 27 times of 288 over 28 OS} if SC0 = 15 kHz(any combination where 320, 352, 416 is placed in different position(s) is also considered) {one 320, six 288 over 7 OS}, {seven 288 over 7 OS} or {two 320, five 288 over 7 OS} or {four 320, three 288 over 7 OS} |
| Ts-8 | 1024 | 60 kHz | Ts/2 | (similar to Ts-6 by replacing 160 with 80, 144 with 72, 208 with 104, 176 with 88) |
| Ts-9 | 512 | 60 kHz | Ts | (similar to Ts-6 by replacing 160 with 40, 144 with 36, 208 with 52, 176 with 44) |
| Ts-10 | 2048 | 7.5 kHz | 2 *Ts | Alt 1: {160, 144, 144, 144, 144, 144, 144}Alt 2: {144 . . . 144} or {80, 72 . . . 72} {72 . . . 72} (7 OS)Alt 3: {152, 144, 144, 152, 144, 144, 144}(any combination where 160, 176, 208 is placed in different position(s) is also considered) |
| Ts-11 | 4096 | 7.5 kHz | Ts | (similar to Ts-10 by multiplying each value by 2, i.e. 160 with 320) |
| Ts-12 | 1024 | 7.5 kHz | 4 * Ts | (similar to Ts-10 by multiplying each value by ½, i.e. 160 with 80) |
| Ts-13 | 2048 | 3.75 kHz | 4* Ts | Alt 1: {160, 144, 144, 144, 144, 144, 144}Alt 2: {144 . . . 144}, or {80, 72, 72, 72, 72, 72, 72, 72} or {40, 36 . . . 36} or {72 . . . 72} or {36 . . . 36} or {144 . . . 144}Alt 3: {592, 592, 576, 592, 576, 592, 576}(any combination set of numbers in a set is possible) |
| Ts-14 | 128 | 3.75 kHz | 64 * Ts | Alt 1: {10, 9, 9, 9 9, 9, 9}Alt 2: {9 . . . 9} (remaining 1 Ts-14) or {5, 5, 5, 5, 4, 4, 4} (remaining 32 Ts-14) or {4 . . . 4} (remaining 36 Ts-14)Alt 3: N/A(any combination set of numbers in a set is possible) |
| Ts-15 | 64 | 3.75 kHz | 128 * Ts | (7 OS)Alt 1: {5, 5, 5, 5, 4, 4, 4} or {5, 5, 4, 4, 5, 4, 5, 4} or {5, 4, 5, 4, 5, 4, 5} or {4 times of 5 and 3 times of 4}Alt 2: {4, 4, 4, 4, 4, 4, 4} (remaining 4 Ts-15) Or {3, 3, 2, 2, 2, 2, 2} (remaining of 16 Ts-15) or {2 . . . 2} (remaining of 18 Ts-15)Alt 3: N/A(any combination set of numbers in a set is possible) |
| Ts-16 | 32 | 3.75 kHz | 256 * Ts | (7 OS)Alt 1: {3, 3, 2, 2, 2, 2, 2} or {3, 2, 2, 3, 2, 2, 2} or {3 2 2 2 2 2 3} or (any combination of 2 times of 3 and 4 times of 2)Alt 2: {2 . . . 2} (remaining of 2 Ts-16) or {2, 1 . . . 1} (remaining of 8 Ts-16) or {1, 1 . . . 1} (remaining of 8 Ts-16) |

TABLE 2-continued

| | FFT size | Subcarrier Spacing | In Ts | CP length in normal CP in Ts-x |
|---|---|---|---|---|
| Ts-17 | 16 | 3.75 kHz | 512 * Ts | (7 OS)Alt 1: {2, 1, 1, 1, 1, 1, 1} or (any combination of 1 times of 2 and 6 times of 1)Alt 2: {1, 1 . . .} (remaining of 1 Ts-17) |
| Ts-18 | 128 | 15 kHz | 16 * Ts | (7 OS) Alt 1: {10, 9, 9, 9, 9, 9, 9}Alt 2: {9 . . . 9} (remaining 1 Ts-14) or {5, 5, 5, 5, 4, 4, 4} (remaining 32 Ts-14) or {4 . . . 4} (remaining 36 Ts-14)(any combination set of numbers in a set is possible) |
| Ts-19 | 64 | 15 kHz | 32 * Ts | (7 OS)Alt 1: {5, 5, 5, 5, 4, 4, 4} or {5, 5, 4, 5, 4, 5, 4} or {5, 4, 5, 4, 5, 4, 5} or {4 times of 5 and 3 times of 4}Alt 2: {4, 4, 4, 4, 4, 4, 4} (remaining 4 Ts-15) Or {3, 3, 2, 2, 2, 2, 2} (remaining of 16 Ts-15)or {2 . . . 2} (remaining of 18 Ts-15)Alt 3: {5, 5, 4, 5, 4, 5, 4} or {5, 4, 5, 4, 5, 4, 5} assuming 15 kHz subcarrier spacing of SC0 (e.g. 128 FFT size) (any combination set of numbers in a set is possible) |
| Ts-20 | 32 | 15 kHz | 64 * Ts | (7 OS)Alt 1: {3, 3, 2, 2, 2, 2, 2} or {3, 2, 2, 3, 2, 2, 2} or {3, 2, 2, 2, 2, 2, 3} or (any combination of 2 times of 3 and 4 times of 2) Alt 2: {2 . . . 2} (remaining of 2 Ts-16) or {2, 1 . . . 1} (remaining of 8 Ts-16) or {1, 1 . . . 1} (remaining of 8 Ts-16)Alt 3: {3, 2, 2, 3, 2, 2, 2} or {2, 3, 2, 2, 3, 2, 2} assuming 15 kHz subcarrier spacing of SC0 (e.g. 128 FFT size or 64 FFT size) |
| Ts-21 | 128 | 30 kHz | 16 * Ts | (7 OS)Alt 1: {10, 9, 9, 9, 9, 9, 9}Alt 2: {9 . . . 9} (remaining 1 Ts-14) or {5, 5, 5, 5, 4, 4, 4} (remaining 32 Ts-14) or {4, .., 4} (remaining 36 Ts-14)Alt 3: {10, 10, 9, 9, 9, 9, 9, 9, 9, 9, 9, 9, 9, 9} (14 OS) assuming 15 kHz subcarrier spacing of SC0(any combination set of numbers in a set is possible) |
| Ts-22 | 64 | 30 kHz | 32 * Ts | (7 OS)Alt 1: {5, 5, 5, 5, 4, 4, 4} or {5, 5, 4, 5, 4, 5, 4} or {5, 4, 5, 4, 5, 4, 5} or {4 times of 5 and 3 times of 4}Alt 2: {4, 4, 4, 4, 4, 4, 4} (remaining 4 Ts-15) Or {3, 3, 2, 2, 2, 2, 2} (remaining of 16 Ts-15) or {2 . . . 2} (remaining of 18 Ts-15)Alt 3: {5, 5, 5, 4, 5, 4, 5, 4, 5, 4, 5, 4, 5, 4} or {5, 5, 4, 5, 4, 5, 4, 5, 4, 5, 4, 5, 4, 5} assuming 15 kHz subcarrier spacing of SC0 (some other combinations are also possible, e.g. switching 4, 5 to 5, 4 in any number of places)(14 OS) (any combination set of numbers in a set is possible) |
| Ts-23 | 32 | 30 kHz | 64 * Ts | (7 OS)Alt 1: {3, 3, 2, 2, 2, 2, 2} or {3, 2, 2, 3, 2, 2, 2} or {3, 2, 2, 2, 2, 2, 3} or (any combination of 2 times of 3 and 4 times of 2)Alt 2: {2 . . . 2} (remaining of 2 Ts-16) or {2, 1 . . . 1} (remaining of 8 Ts-16) or {1, 1 . . . 1} (remaining of 8 Ts-16)Alt 3: {3, 2, 2, 2, 3, 2, 2, 2, 3, 2, 2, 2, 3, 2} or {3, 2, 2, 3, 2, 2, 2, 3, 2, 2, 2, 3, 2, 2} assuming 15 kHz subcarrier spacing of SC0 (some other combinations are also possible, e.g. switching 2, 2, 3, 2 to 2, 3, 2, 2 (or 3, 2, 2, 2) in any number of places) (14 OS) (any combination set of numbers in a set is possible) |
| Ts-24 | 128 | 60 kHz | 16 * Ts | (7 OS)Alt 1: {10, 9, 9, 9, 9, 9, 9}Alt 2: {9 . . . 9} (remaining 1 Ts-14) or {5, 5, 5, 5, 4, 4, 4} (remaining 32 Ts-14) or {4 . . . 4} (remaining 36 Ts-14)Alt 3: For 60 kHz subcarrier spacing and 128 FFT size, {10, 10, 10, 10, 9, 9, 9} {9, 9, 9, 9, 9, 9, 9} {9, 9, 9, 9, 9, 9, 9} {9, 9, 9, 9, 9, 9, 9} from 1st slot to 4th slot (repeated in 28 OS) assuming 15 kHz subcarrier spacing of SC0 (any combination set of numbers in a set is possible) |
| Ts-25 | 64 | 60 kHz | 32 * Ts | (7 OS)Alt 1: {5, 5, 5, 5, 4, 4, 4} or {5, 5, 4, 5, 4, 5, 4} or {5, 4, 5, 4 ,5, 4, 5} or {4 times of 5 and 3 times of 4}Alt 2: {4, 4, 4, 4, 4, 4, 4} (remaining 4 Ts-15) Or {3, 3, 2, 2, 2, 2, 2} (remaining of 16 Ts-15) or {2 . . . 2} (remaining of 18 Ts-15)Alt 3: For 60 kHz subcarrier spacing and 64 FFT size, {5, 5, 5, 5, 5, 4, 5} {4, 5, 4, 5, 4, 5, 4} {5, 4, 5, 4, 5, 4, 5} {4, 5, 4, 5, 4, 5, 4} or {5, 5, 5, 5, 4, 5, 4} {5, 4, 5, 4, 5, 4, 5} {4, 5, 4, 5, 4, 5, 4} {5, 4, 5, 4, 5, 4, 5} from 1st slot to 4th slot assuming 15 kHz subcarrier spacing of SC0 (repeated in 28 OS) (some other combinations are also possible, e.g. switching 4, 5 to 5, 4 in any number of places)(any combination set of numbers in a set is possible) |

TABLE 2-continued

| | FFT size | Subcarrier Spacing | In Ts | CP length in normal CP in Ts-x |
|---|---|---|---|---|
| Ts-26 | 32 | 60 kHz | 64 * Ts | (7 OS)Alt 1: {3, 3, 2, 2, 2, 2, 2} or {3, 2, 2, 3, 2, 2, 2} or {3, 2, 2, 2, 2, 2, 3} or (any combination of 2 times of 3 and 4 times of 2)Alt 2: {2 . . . 2} (remaining of 2 Ts-16) or {2, 1 . . . 1} (remaining of 8 Ts-16) or {1, 1 . . . 1} (remaining of 8 Ts-16)Alt 3: For 60 kHz subcarrier spacing and 32 FFT size, {3, 2, 3, 2, 3, 2, 2} {2, 3, 2, 2, 2, 3, 2} {2, 2, 3, 2, 2, 2, 3} {2, 2, 2, 3, 2, 2, 2} or {3, 2, 3, 2, 2, 3, 2}, {2, 2, 3, 2, 2, 2, 3} {2, 2, 2, 3, 2, 2, 2} {3, 2, 2, 2, 3, 2, 2} from 1st slot to 4th slot assuming 15 kHz subcarrier spacing of SC0 (repeated in 28 OS) (some other combinations are also possible, e.g. switching 2, 2, 3, 2 to 2, 3, 2, 2 (or 3, 2, 2, 2) in any number of places)(any combination set of numbers in a set is possible) |

Two cases may be considered. First case is that the same FFT size is assumed. Thus, sampling rate may linearly increase with subcarrier spacing. The second case is that the same sampling rate is kept, i.e. FFT size is reduced. In the description below, CP1 is the larger CP in Ts-x per each case (assuming Ts-x is for the reference subcarrier spacing) based on the CP length). For example, CP1=160 with 15 kHz subcarrier spacing and 2048 FFT size, CP1=160 with 30 kHz subcarrier spacing and 2048 FFT size, CP1=80 with 30 kHz subcarrier spacing and 1024 FFT size). And, CP2 is the smaller CP in Ts-x per each case. In other words, CP1 may be the CP length of special OS, and CP 2 may be used for the rest OSs.

(1) First case: Same FFT size is assumed.

FIG. 6 shows an example of CP lengths according to an embodiment of the present invention. Referring to FIG. 6, different subcarrier spacing and/or numerology is aligned at symbol level. The reference subcarrier spacing may be assumed as 15 kHz. In 15 kHz subcarrier spacing (SC0, CP lengths can be constructed such that the first OS has CP1 and the remaining OSs (6 OSs) have CP2. In 30 kHz subcarrier spacing (SC0*2=SC1), CP length can be constructed such that the first and second OSs have CP1/2 and the remaining OSs (12 OSs) have CP2/2. In 60 kHz subcarrier spacing (SC0*4=SC2), CP length can be constructed such that the first to fourth OSs have CP1/4 and the remaining OSs (24 OSs) have CP2/4. In 7.5 kHz subcarrier spacing (SC0/2), CP length can be constructed such that the first OSs has CP1+CP2 and the remaining OSs have CP2*2. In 3.75 kHz subcarrier spacing (SC0/4), CP length can be constructed such that the first OSs has CP1+3*CP2 and the remaining OSs have CP2*4. In this case, options of CP length may be represented by Table 3 below.

TABLE 3

| Subcarrier spacing | CP length |
|---|---|
| 15 kHz or SC0(Reference subcarrier spacing) | CP1 (SC0), CP2 (SC0), CP2 (SC0), CP2 (SC0), CP2 (SC0), CP2 (SC0), CP2 (SC0), (repeat in every 7 OS) |
| 30 kHz or SC0*2 | {CP1 (SC0), CP1 (SC0), CP2 (SC0) . . . CP2 (SC0)} (two times of CP1, twelve times of CP2) (repeat in every 14 OS) |
| 60 kHz or SC0*4 | {CP1 (SC0), CP1 (SC0), CP1 (SC0), CP1 (SC0), CP2 (SC0) . . . CP2 (SC0)} (four times of CP1, 24 times of CP2) (repeat in every 28 OS) |
| 120 kHz or SC0*8 | {CP1 (SC0) . . . CP1 (SC0), CP2 (SC0) . . . CP2 (SC0)} (8 times of CP1, 48 times of CP2) (repeat in every 56 OS) |
| 7.5 kHz or SC0/2 | {160 + 144, 144 + 144, 144 + 144, 160 + 144, 144 + 144, 144 + 144, 144 + 144 assuming 2048 FFT size{(CP1 (SC0) + CP2(SC0))/2, (CP2(SC0) + CP2(SC0)/2), (CP2(SC0) + CP2(SC0)/2), (CP1 (SC0) + CP2(SC0))/2, (CP2(SC0) + CP2(SC0)/2), (CP2(SC0) + CP2(SC0)/2), (CP2(SC0) + CP2(SC0)/2)} |
| 3.75 kHz or SC0/4 | 160 + 144 + 144 + 144, 144 + 144 + 144 + 160, 144 + 144 + 144 + 144, 144 + 144 + 160 + 144, 144 + 144 + 144 + 144, 144 + 160 + 144 + 144, 144 + 144 + 144 + 144 assuming 2048 FFT size (160 and 144 can be replaced by CP1 (SC0) and CP2 (SC0)) |

Table 4 shows an example of CP length according to a subcarrier spacing, which is more detailed than Table 3 based on LTE as reference.

TABLE 4

| | FFT size | Subcarrier spacing | In Ts | CP length in normal CP in Ts of LTE |
|---|---|---|---|---|
| Ts-1 | 2048 | 15 kHz | Ts | {160, 144, 144, 144, 144, 144, 144} |
| Ts-3 | 2048 | 30 kHz | Ts/2 | {80, 80, 72, 72, 72, 72, 72} in even slot{72, 72, 72, 72, 72, 72, 72} in odd slot |

TABLE 4-continued

| | FFT size | Subcarrier spacing | In Ts | CP length in normal CP in Ts of LTE |
|---|---|---|---|---|
| Ts-6 | 2048 | 60 kHz | Ts/4 | {40, 40, 40, 40, 36, 36, 36} in first slot{36, 36, 36, 36, 36, 36, 36} from second to fourth slot |
| Ts-10 | 2048 | 7.5 kHz | 2 *Ts | {304, 288, 288, 304, 288, 288, 288} |
| Ts-13 | 2048 | 3.75 kHz | 4* Ts | {592, 592, 576, 592, 576, 592, 576} |
| Ts-15 | 64 | 3.75 kHz | 128 * Ts | {640, 640, 640, 640, 512, 512, 512} or any combination of 4 times of 640 and 3 times of 512 |

FIG. 7 shows another example of CP lengths according to an embodiment of the present invention. Referring to FIG. 7, different subcarrier spacing and/or numerology is aligned at slot or subframe level. In this case, options of CP length may be represented by Table 5 below.

When different subcarrier spacing and/or numerology is aligned at multiple slot/subframe level, any set from Table 2 may be used.

(2) Second case: FFT size is reduced for larger subcarrier spacing (i.e. the same sampling rate is assumed)

TABLE 5

| Subcarrier spacing | CP length |
|---|---|
| 15 kHz or SC0(Reference subcarrier spacing) | {CP1 (SC0), CP2 (SC0), CP2 (SC0), CP2 (SC0), CP2 (SC0), CP2 (SC0), CP2 (SC0)} (repeat in every 7 OS) |
| 30 kHz or SC0*2 | {CP1 (SC0), CP1 (SC0), CP2 (SC0) . . . CP2 (SC0)} (two times of CP1, twelve times of CP2) (repeat in every 14 OS) or {CP1 (SC0) + CP1-CP2 (SC0), CP2 (SC0) . . . CP2 (SC0)} (repeat in every 14 OS) |
| 60 kHz or SC0*4 | {CP1 (SC0), CP1 (SC0), CP1 (SC0), CP1 (SC0), CP2 (SC0) . . . CP2 (SC0)} (four times of CP1, 24 times of CP2) (repeat in every 28 OS) or {CP1 (SC0) + 3 *(CP1-CP2 (SC0)), CP2 (SC0) . . .}{one times of large CP with 27 CP2} (repeat in every 28 OS), or {CP1 (SC0) + 2*(CP1-CP2 (SC0)), CP1 (SC0) + 2*(CP1-CP2 (SC0)), CP2 (SC0) . . .}(repeat in every 28 OS) |
| 120 kHz or SC0*8 | {CP1 (SC0) . . . CP1 (SC0), CP2 (SC0) . . . CP2 (SC0)} (8 times of CP1, 48 times of CP2) (repeat in every 56 OS), 8 times of {CP1-CP2} can be distributed in different OS |
| 7.5 kHz or SC0/2 | {CP1 (SC0), CP2 (SC0), CP2 (SC0), CP2 (SC0), CP2 (SC0), CP2 (SC0), CP2 (SC0)} (repeat in every 7 OS) |
| 3.75 kHz or SC0/4 | {CP1 (SC0), CP2 (SC0), CP2 (SC0), CP2 (SC0), CP2 (SC0), CP2 (SC0), CP2 (SC0)} (repeat in every 7 OS) |

Table 6 shows options of CP length for a nested frame structure in a slot/subframe level alignment only. Any combination of base CP option may be possible in this option.

In this case, CP1 (SC0) may be replaced by CP1 (SC0)/m, where m is FFT size of SC0/FFT size of SC1 (assuming 2^m scale) in the first case. Further, it may be assumed that 1.4

TABLE 6

| Subcarrier spacing | CP length |
|---|---|
| 15 kHz or SC0(Reference subcarrier spacing) | {CP1 (SC0), CP2 (SC0), CP2 (SC0), CP2 (SC0), CP2 (SC0), CP2 (SC0), CP2 (SC0)} (repeat in every 7 OS) |
| 30 kHz or SC0*2 | {CP1 (SC0), CP2 (SC0), CP2 (SC0), CP2 (SC0), CP2 (SC0), CP2 (SC0), CP2 (SC0)}/2 (repeat in every 7 OS) |
| 60 kHz or SC0*4 | {CP1 (SC0), CP2 (SC0), CP2 (SC0), CP2 (SC0), CP2 (SC0), CP2 (SC0), CP2 (SC0)}/4 (repeat in every 7 OS) |
| 120 kHz or SC0*8 | {CP1 (SC0), CP2 (SC0), CP2 (SC0), CP2 (SC0), CP2 (SC0), CP2 (SC0), CP2 (SC0)}/8 (repeat in every 7 OS) |
| 7.5 kHz or SC0/2 | {CP1 (SC0), CP2 (SC0), CP2 (SC0), CP2 (SC0), CP2 (SC0), CP2 (SC0), CP2 (SC0)}*2 or {CP1 (SC0), CP2 (SC0), CP2 (SC0), CP2 (SC0), CP2 (SC0), CP2 (SC0), CP2 (SC0)} (repeat in every 7 OS) (repeat in every 7 OS) |
| 3.75 kHz or SC0/4 | {CP1 (SC0), CP2 (SC0), CP2 (SC0), CP2 (SC0), CP2 (SC0), CP2 (SC0), CP2 (SC0)}*4 or {CP1 (SC0), CP2 (SC0), CP2 (SC0), CP2 (SC0), CP2 (SC0), CP2 (SC0), CP2 (SC0)} *2 or {CP1 (SC0), CP2 (SC0), CP2 (SC0), CP2 (SC0), CP2 (SC0), CP2 (SC0), CP2 (SC0)} *2 (repeat in every 7 OS) (repeat in every 7 OS) |

MHz bandwidth with 128 FFT size is used for 15 kHz subcarrier spacing. Further, alignment among different numerologies may be met in multiple subframe levels in this case.

Followings are examples.

A. For 30 kHz subcarrier spacing
1) SF0: {10, 10, 9, 9, 9, 9, 9}/SF1: {9, 9, 9, 9, 9, 9, 9}
2) SF0: {11, 9, 9, 9, 9, 9, 9}/SF1: {9, 9, 9, 9, 9, 9, 9}
3) Not align subframe boundaries with the slot boundaries of 15 kHz subcarrier spacing
SF0: {10, 9, 9, 9, 9, 9, 9}/SF1: {10, 9, 9, 9, 9, 9, 9}

B. For 60 kHz subcarrier spacing
1) SF0: {10, 10, 10, 10, 9, 9, 9}/SF1: {9, 9, 9, 9, 9, 9, 9}/SF2: {9, 9, 9, 9, 9, 9, 9}/SF3: {9, 9, 9, 9, 9, 9, 9}
2) SF0: {11, 11, 9, 9, 9, 9, 9}/SF1: {9, 9, 9, 9, 9, 9, 9}/SF2: {9, 9, 9, 9, 9, 9, 9}/SF3: {9, 9, 9, 9, 9, 9, 9}
3) SF0: {13, 9, 9, 9, 9, 9, 9}/SF1: {9, 9, 9, 9, 9, 9, 9}/SF2: {9, 9, 9, 9, 9, 9, 9}/SF3: {9, 9, 9, 9, 9, 9, 9}
4) SF0: {12, 10, 9, 9, 9, 9, 9}/SF1: {9, 9, 9, 9, 9, 9, 9}/SF2: {9, 9, 9, 9, 9, 9, 9}/SF3: {9, 9, 9, 9, 9, 9, 9}
5) SF0: {10, 10, 9, 9, 9, 9, 9}/SF1: {10, 10, 9, 9, 9, 9, 9}/SF2: {9, 9, 9, 9, 9, 9, 9}/SF3: {9, 9, 9, 9, 9, 9, 9}
6) SF0: {12, 9, 9, 9, 9, 9, 9}/SF1: {10, 9, 9, 9, 9, 9, 9}/SF2: {9, 9, 9, 9, 9, 9, 9}/SF3: {9, 9, 9, 9, 9, 9, 9}
7) SF0: {11, 9, 9, 9, 9, 9, 9}/SF1: {11, 9, 9, 9, 9, 9, 9}/SF2: {9, 9, 9, 9, 9, 9, 9}/SF3: {9, 9, 9, 9, 9, 9, 9}
8) Not align subframe boundaries with 30 kHz subcarrier spacing SF0: {10, 9, 9, 9, 9, 9, 9}/SF1: {10, 9, 9, 9, 9, 9, 9}/SF2: {10, 9, 9, 9, 9, 9, 9}/SF3: {10, 9, 9, 9, 9, 9, 9}
9) Not align subframe boundaries with 30 kHz subcarrier spacing SF0: {10, 10, 9, 9, 9, 9, 9}/SF1: {9, 9, 9, 9, 9, 9, 9}/SF2: {10, 10, 9, 9, 9, 9, 9}/SF3: {9, 9, 9, 9, 9, 9, 9}
10) Not align subframe boundaries with 30 kHz subcarrier spacing SF0: {11, 9, 9, 9, 9, 9, 9}/SF1: {9, 9, 9, 9, 9, 9, 9}/SF2: {11, 9, 9, 9, 9, 9, 9}/SF3: {9, 9, 9, 9, 9, 9, 9}
11) Not align subframe boundaries with 30 kHz subcarrier spacing SF0: {12, 9, 9, 9, 9, 9, 9}/SF1: {9, 9, 9, 9, 9, 9, 9}/SF2: {10, 9, 9, 9, 9, 9, 9}/SF3: {9, 9, 9, 9, 9, 9, 9}

Considering options and approaches described above, Table 7 to Table 9 shows slot structure for 15 kHz, 30 kHz and 60 kHz subcarrier spacing, respectively. In Table 7 to Table 9, the sampling rate may be assumed as 30720 (=15*2048) for all subcarrier spacing, like the current sample rate in 3GPP LTE. However, the sampling rate may be different from each other for different subcarrier spacing.

TABLE 7

| CP | | CP | | CP | | CP | | CP | | CP | | CP | |
|---|---|---|---|---|---|---|---|---|---|---|---|---|---|
| 160 | 2048 | 144 | 2048 | 144 | 2048 | 144 | 2048 | 144 | 2048 | 144 | 2048 | 144 | 2048 |

TABLE 8

| Slot index | CP | | CP | | CP | | CP | | CP | | CP | | CP | |
|---|---|---|---|---|---|---|---|---|---|---|---|---|---|---|
| 1) Option 1 | | | | | | | | | | | | | | |
| Slot index % 2 = 0 | 80 | 1024 | 80 | 1024 | 72 | 1024 | 72 | 1024 | 72 | 1024 | 72 | 1024 | 72 | 1024 |
| Slot index % 2 = 1 | 72 | 1024 | 72 | 1024 | 72 | 1024 | 72 | 1024 | 72 | 1024 | 72 | 1024 | 72 | 1024 |
| 2) Option 2 | | | | | | | | | | | | | | |
| Slot index % 2 = 0 | 88 | 1024 | 72 | 1024 | 72 | 1024 | 72 | 1024 | 72 | 1024 | 72 | 1024 | 72 | 1024 |
| Slot index % 2 = 1 | 72 | 1024 | 72 | 1024 | 72 | 1024 | 72 | 1024 | 72 | 1024 | 72 | 1024 | 72 | 1024 |
| 3) Option 3 | | | | | | | | | | | | | | |
| Slot index % 2 = 0 | 80 | 1024 | 72 | 1024 | 72 | 1024 | 72 | 1024 | 72 | 1024 | 72 | 1024 | 72 | 1024 |
| Slot index % 2 = 1 | 80 | 1024 | 72 | 1024 | 72 | 1024 | 72 | 1024 | 72 | 1024 | 72 | 1024 | 72 | 1024 |

TABLE 9

| Slot index | CP | | CP | | CP | | CP | | CP | | CP | | CP | |
|---|---|---|---|---|---|---|---|---|---|---|---|---|---|
| *1) Option 1* | | | | | | | | | | | | | |
| Slot index % 4 = 0 | 40 | 512 | 40 | 512 | 40 | 512 | 40 | 512 | 36 | 512 | 36 | 512 | 36 | 512 |
| Slot index % 4 = 1 | 36 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| *2) Option 2* | | | | | | | | | | | | | |
| Slot index % 4 = 0 | 44 | 512 | 44 | 512 | 36 | 512 | 36 | 512 | 36 | 512 | 36 | 512 | 36 | 512 |
| Slot index % 4 = 1 | 36 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| *3) Option 3* | | | | | | | | | | | | | |
| Slot index % 4 = 0 | 52 | 512 | 36 | 512 | 36 | 512 | 36 | 512 | 36 | 512 | 36 | 512 | 36 | 512 |
| Slot index % 4 = 1 | 36 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| *4) Option 4* | | | | | | | | | | | | | |
| Slot index % 4 = 0 | 48 | 512 | 40 | 512 | 36 | 512 | 36 | 512 | 36 | 512 | 36 | 512 | 36 | 512 |
| Slot index % 4 = 1 | 36 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| *5) Option 5* | | | | | | | | | | | | | |
| Slot index % 4 = 0 | 40 | 512 | 40 | 512 | 36 | 512 | 36 | 512 | 36 | 512 | 36 | 512 | 36 | 512 |
| Slot index % 4 = 1 | 40 | 512 | 40 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| *6) Option 6* | | | | | | | | | | | | | |
| Slot index % 4 = 0 | 48 | 512 | 36 | 512 | 36 | 512 | 36 | 512 | 36 | 512 | 36 | 512 | 36 | 512 |

TABLE 9-continued

| Slot index | CP | | CP | | CP | | CP | | CP | | CP | | CP | |
|---|---|---|---|---|---|---|---|---|---|---|---|---|---|---|
| Slot index % 4 = 1 | 40 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| 7) Option 7 | | | | | | | | | | | | | | |
| Slot index % 4 = 0 | 44 | 512 | 36 | 512 | 36 | 512 | 36 | 512 | 36 | 512 | 36 | 512 | 36 | 512 |
| Slot index % 4 = 1 | 44 | 512 | 36 | 512 | 36 | 512 | 36 | 512 | 36 | 512 | 36 | 512 | 36 | 512 |
| Slot index % 4 = 2 | 36 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |
| 8) Option 8 | | | | | | | | | | | | | | |
| Slot index % 4 = 0 | 40 | 512 | 36 | 512 | 36 | 512 | 36 | 512 | 36 | 512 | 36 | 512 | 36 | 512 |
| Slot index % 4 = 1 | 40 | 512 | 36 | 512 | 36 | 512 | 36 | 512 | 36 | 512 | 36 | 512 | 36 | 512 |
| Slot index % 4 = 2 | 40 | 512 | 36 | 512 | 36 | 512 | 36 | 512 | 36 | 512 | 36 | 512 | 36 | 512 |
| Slot index % 4 = 3 | 40 | 512 | 36 | 512 | 36 | 512 | 36 | 512 | 36 | 512 | 36 | 512 | 36 | 512 |
| 8) Option 9 | | | | | | | | | | | | | | |
| Slot index % 4 = 0 | 44 | 512 | 36 | 512 | 36 | 512 | 36 | 512 | 36 | 512 | 36 | 512 | 36 | 512 |
| Slot index % 4 = 1 | 36 | 512 | 36 | 512 | 36 | 512 | 36 | 512 | 36 | 512 | 36 | 512 | 36 | 512 |
| Slot index % 4 = 2 | 44 | 512 | 36 | 512 | 36 | 512 | 36 | 512 | 36 | 512 | 36 | 512 | 36 | 512 |
| Slot index % 4 = 3 | 36 | 512 | 36 | 512 | 36 | 512 | 36 | 512 | 36 | 512 | 36 | 512 | 36 | 512 |

2. Multiplexing Different Numerologies in a Carrier

For supporting multiple different numerologies in a single carrier, multiple different levels of frequency division multiplexing (FDM) may be considered.

FIG. 8 shows an example of multiplexing different numerologies in a single carrier according to an embodiment of the present invention. Referring to FIG. 8, multiplexing based on the resource unit assumed for the largest subcarrier spacing may be supported. That is, FDM multiplexing may be supported at 1 ms level. In this case, the reference subcarrier spacing may be 15 kHz.

FIG. 9 shows another example of multiplexing different numerologies in a single carrier according to an embodiment of the present invention. Referring to FIG. 9, different numerologies and/or subcarrier spacing may be multiplexed at slot level of reference subcarrier spacing or subframe level of middle size subcarrier spacing.

FIG. 10 shows another example of multiplexing different numerologies in a single carrier according to an embodiment of the present invention. Referring to FIG. 10, different numerologies and/or subcarrier spacing may be multiplexed at subframe level or slot level of the largest subcarrier spacing. In this case, the reference subcarrier spacing may be 60 kHz.

Depending on multiplexing mechanism described above, frame structure may be different. For example, if multiplexing mechanism shown in FIG. 8 is used, from the multiplexing perspective, it may be necessary to align k1 TTIs of SC1 (15 kHz subcarrier spacing), k2 TTIs of SC2 (30 kHz subcarrier spacing), and k3 TTIs of SC3 (60 kHz subcarrier spacing) within the subframe of SC1. For example, k1=1, k2=3 and k3=4. Within each subframe of each subcarrier spacing, different mapping or different short TTI formation may be considered. If multiplexing mechanism shown in FIG. 9 is used, the alignment may be done at slot level rather than subframe level or subframe of different reference subcarrier spacing (in this case, the reference subcarrier spacing may be SC2). If multiplexing mechanism shown in FIG. 10 is used, multiplexing may be done at smaller granularity compared to others, which however requires a bit more considerations on frame structure.

FIG. 11 shows an example of a frame structure considering multiplexing of different subcarrier spacing according to an embodiment of the present invention. Referring to FIG. 11, only alignment is done at 1 ms level or subframe level of reference subcarrier spacing, and mini-subframe may be defined independently per different numerology.

FIG. 12 shows another example of a frame structure considering multiplexing of different subcarrier spacing according to an embodiment of the present invention. Referring to FIG. 12, mini-subframe length is kept as same regardless of numerology which leads different number of OSs in a mini-subframe.

FIG. 13 shows another example of a frame structure considering multiplexing of different subcarrier spacing according to an embodiment of the present invention. Referring to FIG. 13, mini-subframe level at slot may be used for alignment among different numerologies.

FIG. 14 shows another example of a frame structure considering multiplexing of different subcarrier spacing according to an embodiment of the present invention. Referring to FIG. 14, mini-subframe (e.g. 2 OS of reference subcarrier spacing) is kept as same duration regardless of numerology which leads different number of OSs in different numerology, while subframe length may be scaled with subcarrier spacing.

In the description below, how to support efficiently more fast-scale multiplexing (shown in FIG. 13 or FIG. 14), which mainly focusing on multiplexing between SC1 (15 kHz subcarrier spacing), SC2 (30 kHz subcarrier spacing) and SC3 (60 kHz subcarrier spacing), is mainly addressed. Even though not mentioned, SC0 may be 3.75 kHz subcarrier spacing or 7.5 kHz subcarrier spacing. It may be generally assumed that multiplexing between 15 kHz, 7.5 kHz and 3.75 kHz is based on 15 kHz subcarrier spacing. Thus, potentially two reference subcarrier spacing may be used if all subcarrier spacing of 3.75 kHz, 7.5 kHz, 15 kHz, 30 kHz, and 60 kHz are multiplexed. Further, if short TTI is applied to 3.75 kHz subcarrier spacing or 7.5 kHz subcarrier spacing, the concept mentioned in the present invention may be generally applied. However, the reference subcarrier spacing for CP formation and TTI length formation may be different from each other. For example, reference subcarrier spacing for CP formation may be 15 kHz subcarrier spacing, whereas reference subcarrier spacing for TTI formation may be 60 kHz subcarrier spacing. To avoid confusion, reference subcarrier spacing mentioned in the present invention refers the latter, and two values may be different from each other depending on the approaches.

In multiplexing different numerologies in the same frequency with different short TTI (sTTI) length, and so on, among different subcarrier spacing, some considerations should be given. In terms of sTTI length, the absolute time may be same regardless of subcarrier spacing which may determine different OSs in a sTTI. If the minimum length of sTTI is supported in SC1 which is the reference subcarrier spacing, then, length of SC2 and SC3 (assuming SC2=2*SC1, SC3=4*SC1) may become 2 times and 4 times of sTTI length of SC1. More generally, if SC2=m*SC1, the sTTI length may become m*SC1, and if SC3=n*SC1, sTTI length of SC3 may become n*SC1. In this case, if sTTI length of SC1 is 'k' OFDM symbols, sTTI length of SC2 may become k*m, and that of SC3 may become k*n.

FIG. 15 shows another example of multiplexing different numerologies in a single carrier according to an embodiment of the present invention. In this embodiment, it is assumed that k=1 or 2. This is to align among different subcarrier spacing, and multiplex different sTTIs with different numerologies. Referring to FIG. 15, minimum time unit to multiplex different numerology may be 'k' OFDM symbols based on SC1.

FIG. 16 shows another example of multiplexing different numerologies in a single carrier according to an embodiment of the present invention. In this embodiment, it is assumed that k=3 or 4. Further shorter TTI within a numerology may be considered. For example, for SC3, further partitioning of 12 OS into 3*4 OS sTTIs or 6*2 OS sTTIs may be considered.

FIG. 17 shows another example of multiplexing different numerologies in a single carrier according to an embodiment of the present invention. This frame structure may be necessary in case that flexible multiplexing among different numerologies at mini-subframe level or shorter TTI level is necessary. In this case, OSs between two sTTIs are overlapped to have the uniform value of 'k'.

Another example of linearly scale version of sTTI may be to define sTTI with SC3 of k1 OS, and SC1 of k1/(n/m) OS as a basic unit of sTTI and SC2 of k1/n OS. For example, if SC3=4*SC1, and SC2=2*SC1, and sTTI length of SC3 is 4 OS, sTTI length may become 2 OS in SC2, and 1 OS in SC1. k1 may be used for slot. There may be odd number of slots in 1 ms in SC3 (e.g. assuming 60 kHz subcarrier spacing, there are 7 slots in 1 ms), and one subframe may consist of two slots which is 8 OS in total. Then, one subframe in SC3 may consist of 8 OS, one subframe in SC2 may consist of 4 OS, and one subframe in SC1 may consist of 2 OS. One subframe in SC3 may span over 1 ms boundary, So, 2 ms may be considered as a basic unit of multiplexing duration and, minimum size of multiplexing different numerology may be one subframe of the shortest TTI or the largest subcarrier spacing (i.e. 8*OS in SC3 in this example).

In summary, to support the frame structure, different approaches may be considered as follows.

Basic subframe length may be fixed per each subcarrier spacing, assuming minimum 'k' of a reference subcarrier spacing which is used for multiplexing guideline. For example, a reference subcarrier spacing may be 15 kHz or may be configured by higher layer. Basic subframe length of SCi may be defined as k*m, where SCi=SC0*m (SC0 is the reference subcarrier spacing). As mentioned described above, further dividing into shorter TTI within SCi may also be allowed, which is particularly useful in case that k*m is large.

Subframe length of each subcarrier spacing may be defined as 'L' OS in SC which is used for physical mapping for channels, data, etc. If multiplexing is enabled at short TTI level, mapping may become different.

Basic subframe length may be fixed based on the shortest TTI or the largest subcarrier spacing supported in the same carrier, and may be scaled up based on OS length. This may be used only for multiplexing purpose, and channel mapping may be different per each subcarrier spacing, depending on whether sTTI is used for multiplexing purpose or not. For example, based on SC3=4*SC0, it may be assumed that subframe in SC3 consists of 16 OS, subframe in SC2 consists of 8 OS, and subframe in SC1 consists of 4 OS. For another example, with 15 kHz subcarrier spacing as the reference subcarrier spacing, over 2 ms, there may be 7 subframes of SC3/SC2/SC1 and minimum multiplexing size may become 16 OSs in SC3. For SC2 and SC1, this mapping may only be used if sTTI is configured in each subcarrier spacing (or multiplexing is enabled by higher layer configuration).

Another specific example is to define subframe for 60 kHz subcarrier spacing as 8 OS, for 30 kHz subcarrier spacing as 7 OS, for 15 kHz subcarrier spacing for 7 OS, and define the short TTI as follows.

In 60 kHz subcarrier spacing, 2 or 4 OS sTTIs may be considered.

In 30 kHz subcarrier spacing, 2 or 4 OS sTTIs may be considered which may be spanning over multiple subframes of 30 kHz subcarrier spacing.

In 15 kHz subcarrier spacing, 2 or 4 OS sTTIs may be considered which may be spanning over multiple subframe of 15 kHz subcarrier spacing.

FIG. 18 shows another example of multiplexing different numerologies in a single carrier according to an embodiment of the present invention. Referring to FIG. 18, subframe for the largest subcarrier spacing used for multiplexing may be used as a reference to define sTTI length of smaller subcarrier spacing numerologies. If extended CP is used, subframe in SC3 may consists of 12 OS. Thus, sTTI length in SC2 is 6 OS, and sTTI length in SC1 is 3 OS, respectively.

FIG. 19 shows another example of multiplexing different numerologies in a single carrier according to an embodiment of the present invention. Referring to FIG. 19, it may be assumed that reference subcarrier spacing is 15 kHz. In this embodiment, subframe and/or mini-subframe and/or slot of each numerology is aligned with mini-subframe/slot/subframe of numerology of the reference subcarrier spacing (or SC0). For SC0, three different TTI length may be provided: k1 OS, k2 OS, k3 OS (for example, k1=2, k2=7, k3=14). For SC1=SC0*2, two different TTI length may be provided: k1*2 OS, k2*2 OS. For SC2=SC0*4, one TTI length may be provided: k1*4 OS. This approach may be extended to general cases, and 15 kHz may be replaced by reference subcarrier spacing SC0 (i.e. 30 kHz and 60 kHz may be replaced by 2*SC0 and 4*SC0, respectively).

As described above, different TTIs are provided based on the base numerology used in a carrier. The base numerology may be defined by primary cell (PCell) numerology when carrier aggregation (CA) is configured. For example, if 4 GHz carrier and 30 GHz carrier are aggregated and 4 GHz carrier carries synchronization signal based on 30 kHz subcarrier spacing and 30 GHz carrier based on 60 kHz subcarrier spacing, the TTI length for PCell, i.e. 4 GHz carrier, may be 0.5 ms, 0.25 ms, 0.5/7 ms, and TTI length for secondary cell (SCell), i.e. 30 GHz carrier, may be 0.25 ms, 0.5/7 ms. This is to align between different numerologies.

This may allow a carrier to have different numerology depending on the operation or per UE. For example, it may be assumed that there is a carrier with 30 GHz frequency with 60 kHz subcarrier spacing using normal CP as a base numerology. If there are two UEs, one UE may be connected to the carrier as a SCell and the other UE may be connected to the carrier as a PCell. In this case, the subframe for the given carrier may be as follows.

For the UE connected as SCell and PCell utilizes 15 kHz subcarrier spacing as base numerology, one subframe may consist of 8 OS.

For the UE connected as PCell, one subframe may consist of 14 OS.

When different subframe lengths are supported, it may impact the scheduling complexity. To address this issue, one approach may be to fix subframe per subcarrier spacing, regardless of PCell or SCell. In this case, if a carrier operates with 60 kHz subcarrier spacing, regardless of PCell/SCell, subframe length may always be 8 OSs. Further, scheduling over multiple subframe may be supported. Alternatively, the subframe length may be indicated by physical broadcast channel (PBCH).

FIG. 20 shows another example of multiplexing different numerologies in a single carrier according to an embodiment of the present invention. Referring to FIG. 20, subframe length may be defined by scaling down per subcarrier spacing, and virtual mini-subframe may be created which may have the same absolute time. For example, if two mini-subframe size of 2 OSs and 1 OS are considered for base numerology in SC0, 4 OSs and 2 OSs for SC0*2, 8 OSs and 4 OSs for SC0*4 may be considered, respectively.

In this case, mini-subframe of larger subcarrier spacing may be spanned over different subframe to be aligned with lower or base numerology symbol/mini-subframe boundaries. In other words, different sets of subframe length may be defined. Subframe may be defined as 7 or 14 OSs, and mini-subframe may be defined as 1*k or 2*k or m*k OS, where k=SCk/SC0 (SCk is the corresponding subcarrier spacing and SC0 is the reference subcarrier spacing), and m is a size of mini-subframe which may be supported by the base numerology, may be configurable.

3. Subframe Indexing

When different numerology is mixed in the same time/frequency resource with multiple levels of subframe, how to index and how to map mini-subframe and scheduling may need to be clarified. For example, at least one of the following options may be considered at least for PCell base numerology.

(1) Alt 1: Constant number of OS in a subframe may be used. Subframe length may be defined based on numerology searched via initial cell access procedure. Within a 1 ms or 10 ms, there may be different number of subframes depending on numerology. For example, 15 kHz subcarrier spacing may lead 1 subframe, 30 kHz subcarrier spacing may lead 2 subframe, and so on. For 7.5 kHz and 3.75 kHz subcarrier spacing, it may be further considered that only 5 and 2.5 subframes may be present in 10 ms or it may be assumed that subframe is kept as same to those numerologies and the number of effective symbols may change. In terms of OS index, OS index may be based on subframe, and OS index (e.g. 0, 1 . . . 13 or 0, 1 . . . 6, 0, 1 . . . 6) in a subframe may be used similar to LTE.

(2) Subframe may be defined by 1 (or k) ms, which then leads different number of OSs in a subframe depending on numerology. In this case, another indexing on mini-subframe or sub-subframe may be necessary for subcarrier spacing larger than 15 kHz, and another indexing on super-subframe or subframe-group may also be necessary for subcarrier spacing smaller than 15 kHz. For 3.75 kHz, it may be assumed that there are only three OS in 1 ms by either extending CP length or reserve some time duration for some other purpose.

FIG. 21 shows an example of subframe indexing for different numerologies according to an embodiment of the present invention. This embodiment corresponds to option (2) described above. In terms of OS index, two approaches may be considered. If mini-subframe is used, OS index may be based on subframe and separate mini-subframe index may be used. Alternatively, if mini-subframe is always defined (regardless of usage), OS index may be defined based on mini-subframe.

For SCell base numerology, either option (1) or option (2) may be used, and mini-subframe of SCell may be aligned with mini-subframe of PCell with option (2). OS index may be used differently depending on PCell or SCell, if OS index is based on mini-subframe.

FIG. 22 shows another example of subframe indexing for different numerologies according to an embodiment of the present invention. If different numerology is used in a carrier in in-band mode, it may be desirable to align with host numerology. In this case, option (2) like alignment may seem a natural choice, and k ms may defined by the subframe length of base numerology. In other words, no separate subframe may be defined for the numerology multiplexed in-band with host numerology. Instead, mini-subframe (for subcarrier spacing larger than host numerology) or subframe-group (for subcarrier spacing smaller than host numerology) may be defined.

In other words, subframe/OS index may be determined for different cases as follows.

(1) For PCell, subframe/OS index may be determined based on base numerology (assuming that base numerology is the numerology used for synchronization process).

A. Subframe may be defined by K OSs (e.g. K=14 with normal CP, K=12 with extended CP).

B. Mini-subframe may be pre-defined or configured by the system information.

Mini-subframe may be defined by K1 OSs (e.g. K1=1 or K1=2). If K1=1, OS index of base numerology may be used for mini-subframe index for in-band multiplexed numerologies and base numerology.

(2) For PCell/SCell, subframe/OS index may be determined based on in-band multiplexed different numerology SCi (e.g. for URLLC or multimedia broadcast multicast services (MBMS) or mMTC).

A. Subframe may be defined by K OSs of base numerology of the host carrier. For example, if the numerology used for URLLC is 60 kHz subcarrier spacing, whereas host carrier uses 15 kHz subcarrier spacing, subframe may be defined as 1 ms with 14 OSs of 15 kHz subcarrier spacing. If MBMS with 2.5 kHz subcarrier spacing is used, still 1 ms with 14 OSs based on 15 kHz subcarrier spacing may be used.

B. If SCi>SC0, mini-subframe may be defined by floor (K1*(SCi/SC0)) OSs based on SCi. For example, if the numerology used for URLLC is 60 kHz subcarrier spacing whereas host carrier uses 15 kHz subcarrier spacing, mini-subframe may be defined as 8 OSs or 4 OSs (if K1=1 or K1=2). In terms of OS index in SCi, OS index within a mini-subframe may be used if mini-subframe is defined. Otherwise, OS index within 1 subframe of base numerology may be used. The number of OS may be larger than 14, e.g. with 60 kHz subcarrier spacing, OS index may be 0, 1, 2, 3 . . . 55 or there may be 8 slots with OS index from 0, 1 . . . 6.

C. If SCi<SC0, a subframe group may be defined over floor (SC0/SCi) subframes (if necessary). In terms of OS index in SCi, OS index within a subframe group may be used if subframe group is defined. Alternatively, OS index in a subframe of base numerology may be used.

(3) For SCell, subframe/OS index may be determined based on base numerology SC0_SC where PCell base numerology is SC0_PC.

A. SCell OS index and/or subframe may be derived as if the cell is PCell (i.e. follow option (1) above).

B. SCell OS index and/or subframe may be derived as if the cell is in-band operation (i.e. follow option (2) above)

C. If the same use case is the target for PCell/SCell, option A described above may be used. If SCell is for different use case, option B described above may be used.

D. Both subframe and mini-subframe or subframe-group may be defined for SCell. That is, option A and B described above may be used at the same time.

E. If cross-carrier scheduling is used, option B described above may be.

Alternatively, option A described above may be used as a baseline, and option B described above may be used additionally. Otherwise, option A described above may be used.

To align the number of frames/subframes, maximum time duration that frame index can represent may be linearly scaled up or down depending on subcarrier spacing. For example, if frame index is from 0 . . . 1023 with 15 kHz subcarrier spacing, 1024 ms may be represented, and with 30 kHz subcarrier spacing, 512 ms may be represented, and with 3.75 kHz subcarrier spacing, 4096 ms may be represented. In other words, all frame structure may be linearly scaled down or up for the base numerology.

When different numerology is carrier-aggregated, timer and related timing may follow its own subframe definition or may be configured to follow PCell numerology/timing in case there is dependency or configured to do so. For example, if measurement gap is configured, the timing may follow PCell numerology/timing as the gap is common to PCell and SCell. In this case, timer which is independent may follow SCell numerology/timing. If this approach is applied to both PCell/SCell, PCell numerology/timing may be used. If it is independent, each cell's numerology/timing may be used.

4. MBMS Numerology Options

Depending on coverage and channel environments, the required CP length may be different to support MBMS. The shortest CP length may be as small as normal CP with a given subcarrier spacing (i.e. about 7% CP overhead) up to 200 us. To increase CP length, the overall two approaches may be considered, one of which is to decrease subcarrier spacing and the other is to increase CP length with keeping subcarrier spacing.

To allow efficient multiplexing between unicast and multicast in both TDM and FDM, it may be necessary to align MBMS numerology with different sTTI size of unicast. For example, it may be assumed that a subcarrier spacing used for unicast is SC0 with normal CP, and the sTTI length supported by the unicast may be m0*SC0, m1*SC0, m2*SC0 . . . mk-1*SC0 (e.g. m0=2, m1=7 or one slot, mk-1=14). Depending on CP length requirement of MBMS, it may or may not be easily possible to align with all sTTI lengths. The sTTI length may be realized by increasing subcarrier spacing with larger number of OSs while keeping the absolute time as same. For example, instead of m0*SC0, m0*SC0*K may also be considered.

With assumption that SC0=15 kHz, the present invention discusses supportable CP length and possible alignment options. Without loss of generality, it may be expanded to other subcarrier spacing values and the number may be linearly reduced by K, where SCi=SC0*K.

(1) Aligned at m0: Basic principle is to use SCi of MBMS as SCi=SC0/m0, and CPs of m0 symbols in SC0 may be added to create one CP for SCi. For example, if m0 is 2, SCi=7.5 kHz, and CP length for SCi is 144+144 Ts (in SC0). For the handling of larger CP in SC0, the approaches described in the present invention may be applied (e.g. reserve for some other purpose, or absorb in the first OS, etc.). If m0>2, more than one OS in SCi may be considered.

(2) Aligned at m1: Assuming m1 is either 7 OSs or one slot, alignment may become a bit tricky, as 7 cannot be divided into 2 or 4 or 8. One example to utilize this option is to start from extended CP option for SC0 where 6 OS with equal sized CP length is assumed, and try to align MBMS CP to it. For example, if this option is used, one of SCi=SC0/6, SCi=SC0/3, SCi=SC0/2 (in addition to SCi=SC0) may be supported, and the CP length for each option may be 6*512 Ts, 3*512 Ts, 2*512 Ts, respectively (i.e. 6 times of extended CP, 3 times of extended CP, 2 times of extended CP, respectively).

(3) Aligned at mk-1: MBMS numerology may be aligned with a subframe in SC0. Similar to option (2), first option is to consider aligning with extended CP in SC0, i.e. SCi=SC0/12, SCi=SC0/6, SCi=SC0/4, SCi=SC0/3, SCi=SC0/2 (in addition to SCi=SC0) may be supported, and the CP length for each option may be 12*512 Ts, 6*512 Ts, 4*512 Ts, 3*512 Ts, 2*512 Ts, respectively (i.e. 12 times of extended CP, 6 times of extended CP, 4 times of extended CP, 3 times of extended CP, 2 times of extended CP, respectively).

This shows a possibility of aligning sTTI of MBMS numerology with reference/host numerology. If sTTI size is too small (e.g. only a few OSs) for MBMS, alignment between host numerology and MBMS numerology may occur in a multiple subframe level (e.g. 2 or 4 subframe of host subframe). Accordingly, multiple of sTTI may be used as a baseline for MBMS operation. More specifically, the following example may be considered assuming that base numerology is 15 kHz subcarrier spacing. Each pair represents CP length, subcarrier spacing, the number of OSs in a TTI for MBMS. Similarly, for different reference subcarrier spacing (30 kHz or 60 kHz), the scale may be applied by replacing 15 kHz with 30 kHz or 60 kHz.

15 kHz extended CP length*12, 15/12 kHz, 4 or 8 (align at 4 or 8 subframes level)
15 kHz extended CP length*6, 15/6 kHz, 4 or 8 (align at 2 or 4 subframes level)
15 kHz extended CP length*4, 15/4 kHz, 3 or 6 (align at 1 or 2 subframes level)
15 kHz extended CP length*3, 15/3 kHz, 4 or 8 (align at 1 or 2 subframes level)
15 kHz extended CP length*1, 15/1 kHz, 12 (align at 1 subframes level)
15 kHz normal CP length*2, 15/2 kHz, 7 (align at 1 subframes level)
15 kHz normal CP length*4, 15/4 kHz, 7 or 14 (align at 2 or 4 subframes level)
15 kHz normal CP length*7, 15/7 kHz, 4 or 8 (align at 2 or 4 subframes level)

FIG. 23 shows a method for configuring a frame by a network node according to an embodiment of the present invention. The present invention described above may be applied to this embodiment.

In step S100, the network node configures a frame in which a first CP is allocated to a first symbol in every 0.5 ms and a second CP is allocated to remaining symbols in every 0.5 ms. In step S110, the network node communicates with a user equipment (UE) by using the frame. A length of the first CP is longer than a length of the second CP.

The length of the first CP and the length of the second CP, in terms of sampling time, may depend on a subcarrier spacing.

The frame may be a first frame with a first subcarrier spacing, and the first subcarrier spacing may be a reference subcarrier spacing. In this case, the first frame consists of 7 OSs based on the reference subcarrier spacing. Further, the network node may configures a second frame with a second subcarrier spacing. The second subcarrier spacing may be power of 2 for the first subcarrier spacing. The first frame and the second frame may be aligned with each other at OFDM symbol level or slot level or subframe level FIG. 24 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method for configuring a frame by a network node in a wireless communication system, the method comprising:
    determining whether a subcarrier spacing is (i) a first subcarrier spacing of 15 kHz, or (ii) a second subcarrier spacing that is $2^m$ times the first subcarrier spacing, where m is a natural number that represents a subcarrier spacing configuration;
    based on a determination that the subcarrier spacing is equal to the first subcarrier spacing: configuring a first plurality of symbols such that (i) a first cyclic prefix (CP) is allocated to a first symbol and to every 7-th symbol after the first symbol in the first plurality of symbols, and (ii) a second CP is allocated to remaining symbols in the first plurality of symbols, wherein a length of the first CP is longer than a length of the second CP;

based on a determination that the subcarrier spacing is equal to the second subcarrier spacing: configuring a second plurality of symbols such that (i) a third CP is allocated to the first symbol and to every $7*2^m$-th symbol after the first symbol in the second plurality of symbols, and (ii) a fourth CP is allocated to remaining symbols in the second plurality of symbols, wherein a length of the third CP is longer than a length of the fourth CP; and communicating with a user equipment (UE) by using the first plurality of symbols or the second plurality of symbols, based on whether the subcarrier spacing is the first subcarrier spacing or the second subcarrier spacing.

2. The method of claim 1, wherein the length of the first CP, the length of the second CP, the length of the third CP, and the length of the fourth CP, in terms of sampling time, each depends on the subcarrier spacing.

3. The method of claim 1, wherein the first plurality of symbols defines a first time duration with the first subcarrier spacing, and
wherein the first subcarrier spacing is a reference subcarrier spacing.

4. The method of claim 3, wherein the first time duration consists of 7 orthogonal frequency division multiplexing (OFDM) symbols based on the reference subcarrier spacing.

5. The method of claim 3, wherein the second plurality of symbols defines a second time duration with the second subcarrier spacing.

6. The method of claim 5, wherein the first time duration and the second time duration are aligned with each other at OFDM symbol level.

7. The method of claim 5, wherein the first time duration and the second time duration are aligned with each other at slot level.

8. The method of claim 5, wherein the first time duration and the second time duration are aligned with each other at subframe level.

9. A network node configured to operate in a wireless communication system, the network node comprising:
a transceiver;
at least one processor; and
at least one computer memory operably connectable to the at least one processor and storing instructions that, when executed by the at least one processor, perform operations comprising:
determining whether a subcarrier spacing is (i) a first subcarrier spacing of 15 kHz, or (ii) a second subcarrier spacing that is $2^m$ times the first subcarrier spacing, where m is a natural number that represents a subcarrier spacing configuration;

based on a determination that the subcarrier spacing is equal to the first subcarrier spacing: configuring a first plurality of symbols such that (i) a first cyclic prefix (CP) is allocated to a first symbol and to every 7-th symbol after the first symbol in the first plurality of symbols, and (ii) a second CP is allocated to remaining symbols in the first plurality of symbols, wherein a length of the first CP is longer than a length of the second CP;

based on a determination that the subcarrier spacing is equal to the second subcarrier spacing: configuring a second plurality of symbols such that (i) a third CP is allocated to the first symbol and to every $7*2^m$-th symbol after the first symbol in the second plurality of symbols, and (ii) a fourth CP is allocated to remaining symbols in the second plurality of symbols, wherein a length of the third CP is longer than a length of the fourth CP; and controlling the transceiver to communicate with a user equipment (UE) by using the first plurality of symbols or the second plurality of symbols, based on whether the subcarrier spacing is the first subcarrier spacing or the second subcarrier spacing.

10. The network node of claim 9, wherein the length of the first CP, the length of the second CP, the length of the third CP, and the length of the fourth CP, in terms of sampling time, each depends on the subcarrier spacing.

11. The network node of claim 9, wherein the first plurality of symbols defines a first time duration with the first subcarrier spacing, and
wherein the first subcarrier spacing is a reference subcarrier spacing.

12. The network node of claim 11, wherein the first time duration consists of 7 orthogonal frequency division multiplexing (OFDM) symbols based on the reference subcarrier spacing.

13. The network node of claim 11, wherein the second plurality of symbols defines a second time duration with the second subcarrier spacing.

14. The network node of claim 13, wherein the first time duration and the second time duration are aligned with each other at OFDM symbol level or slot level or subframe level.

15. The method of claim 5, wherein the first time duration and the second time duration are aligned with each other at every 0.5 ms.

16. The network node of claim 13, wherein the first time duration and the second time duration are aligned with each other at every 0.5 ms.

* * * * *